United States Patent [19]

Brodeur

[11] 4,021,608
[45] May 3, 1977

[54] PRINT-ON-THE-FLY PAGER

[75] Inventor: Lester R. Brodeur, Nashua, N.H.

[73] Assignee: Sanders Associates, Inc., Nashua, N.H.

[22] Filed: May 22, 1975

[21] Appl. No.: 580,090

[52] U.S. Cl. .............................. 178/30; 178/4.1 A; 178/23 R; 197/1 R; 219/216; 325/55; 340/311
[51] Int. Cl.[2] .................. H04L 21/00; H04L 15/34
[58] Field of Search ............. 178/23 R, 24, 25, 30, 178/4.1 R, 4.1 A; 325/55, 64; 219/216; 340/311; 346/76

[56] References Cited

UNITED STATES PATENTS

| | | | |
|---|---|---|---|
| 2,623,694 | 12/1952 | Peterson | 235/61.11 R |
| 3,476,877 | 11/1969 | Perkins et al. | 178/23 R |
| 3,777,116 | 12/1973 | Brescia et al. | 219/216 |
| 3,846,783 | 11/1974 | Apsell et al. | 325/55 |
| 3,944,724 | 3/1976 | Kilby et al. | 178/4.1 A |

*Primary Examiner*—Thomas A. Robinson
*Attorney, Agent, or Firm*—Louis Etlinger; Robert K. Tendler

[57] ABSTRACT

A hand held pager is disclosed which displays a transmitted message in hard copy form on a tape to permit a written record of the message for readout at the convenience of the recipient of the message. The hard copy pager is provided with a printing system in which the printing medium is continually moved past the printing head without significant degradation of the information recorded so that indexing of either the head or the printing medium is avoided.

3 Claims, 22 Drawing Figures

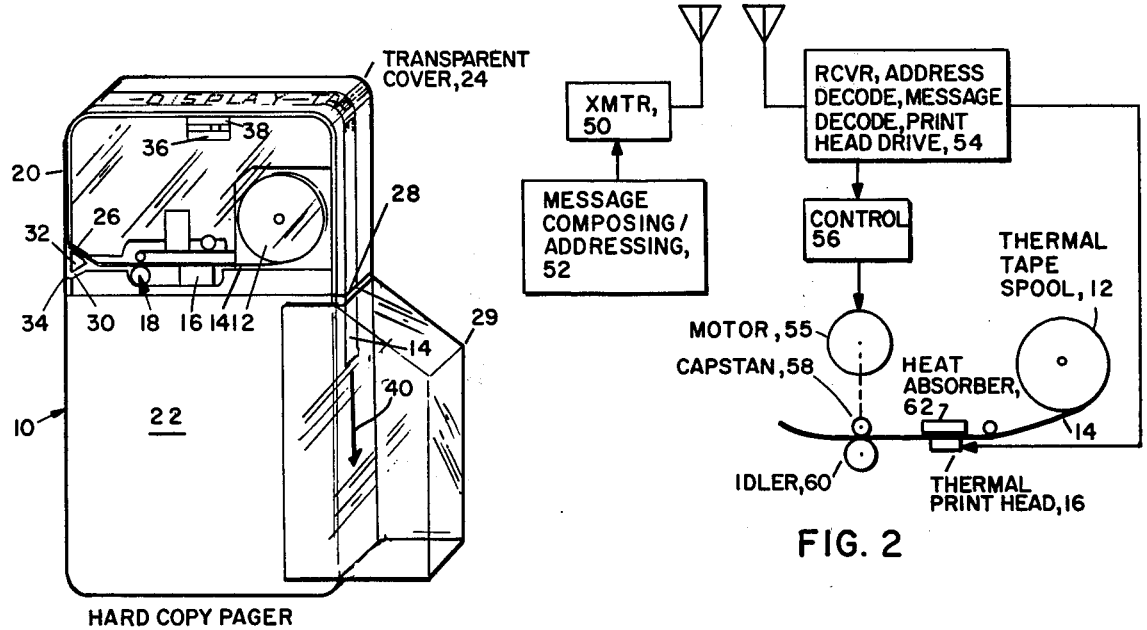
FIG. 1  HARD COPY PAGER
FIG. 2
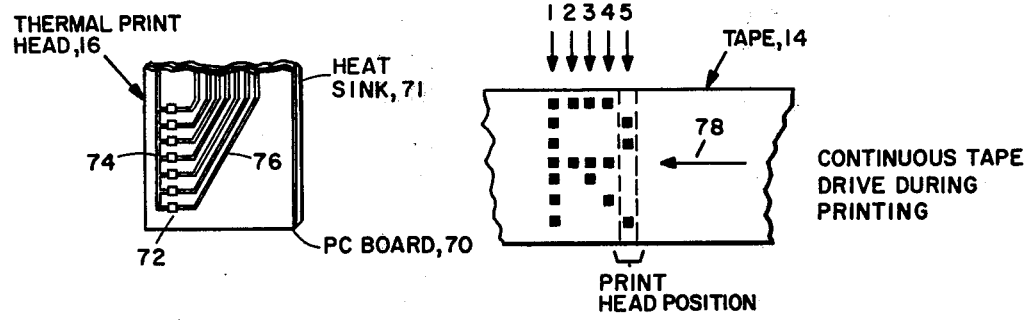
FIG. 3
FIG. 4
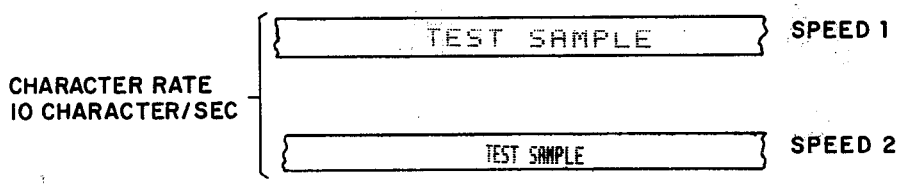
FIG. 5

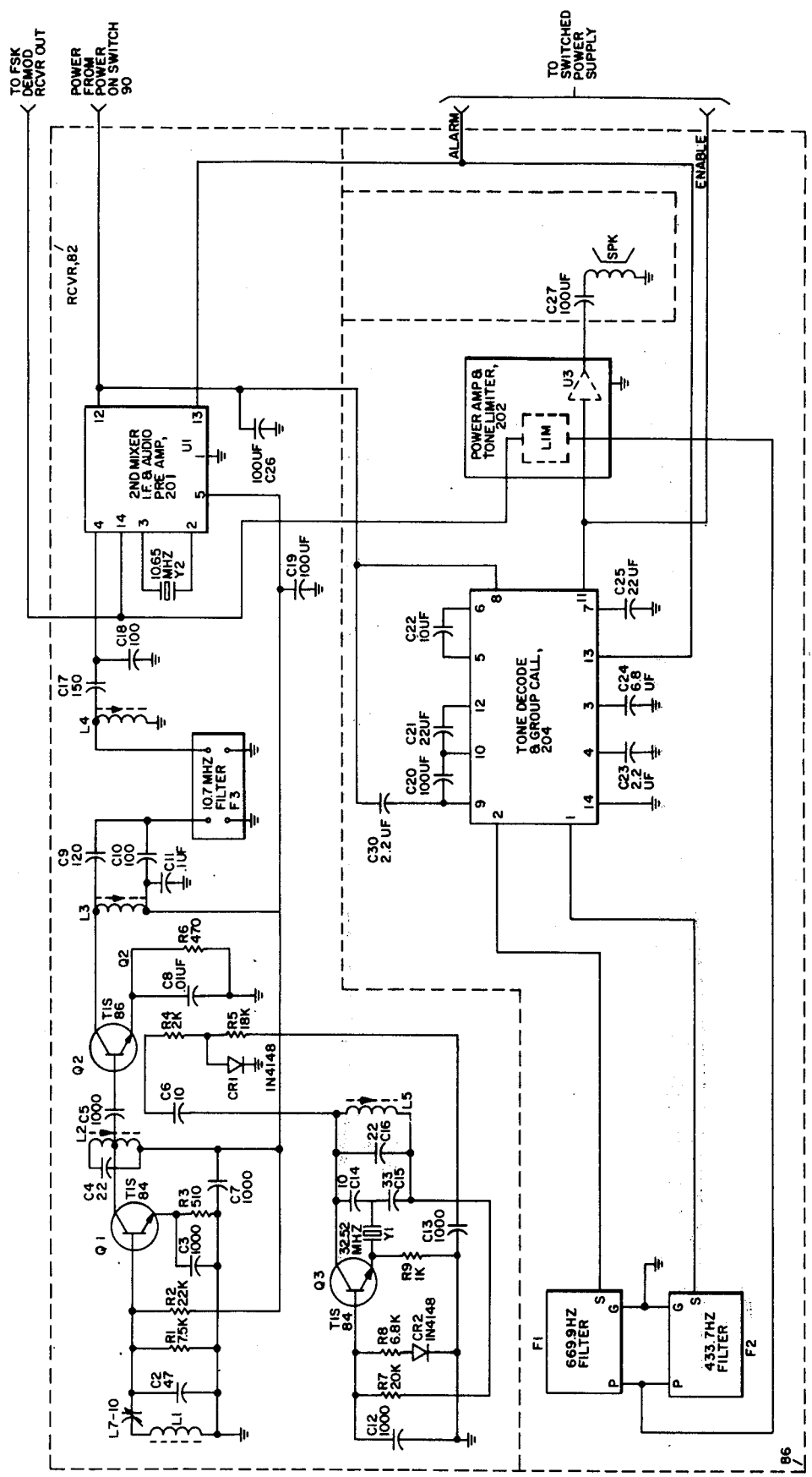
FIG. IIA

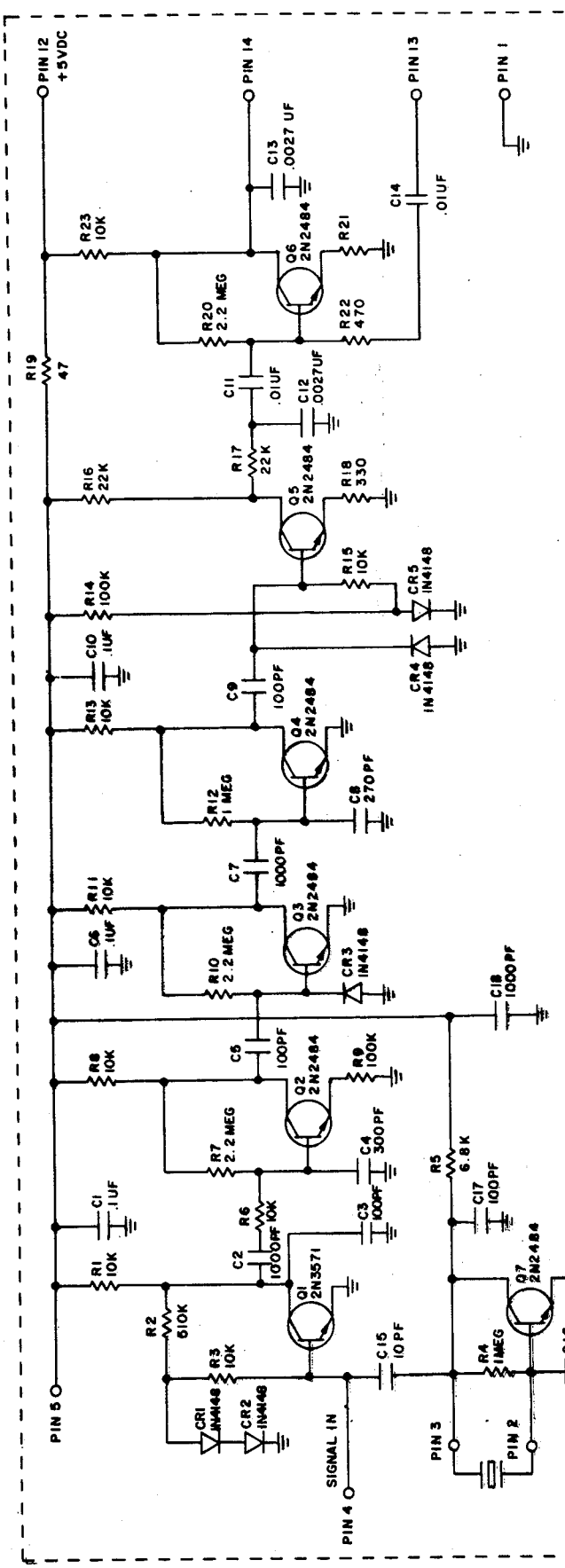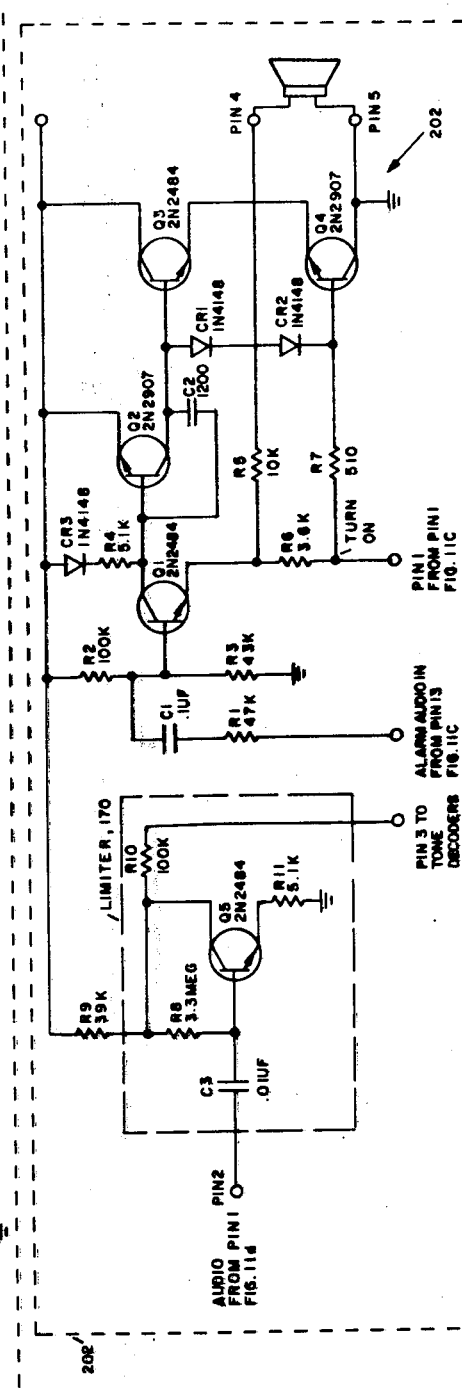
FIG.11D
FIG.11E

PRINT-ON-THE-FLY PAGER

FIELD OF THE INVENTION

This invention relates to paging systems and more particularly to a hand held pager which silently stores the message transmitted to the recipient in such a manner that the message can be read out at the convenience of the recipient.

BACKGROUND OF THE INVENTION

It is common practice to provide pagers which emit an audible tone indicating that a particular recipient is to receive a message. Thereafter, the message is transmitted via voice communication to the recipient whether or not this recipient is ready to receive the message. As a result, the content of the message is sometimes lost when the recipient either cannot remember the content of the message or a pencil and paper is not immediately available to transcribe the message. This results in frustration of the recipient and the necessity of communicating with the originator of the message to obtain its content. In one broad aspect this invention alleviates the inconvenience of the prior art paging systems by providing storage and recall of the transmitted message through the use of a printed tape (hard copy unit).

As illustrated in U.S. Pat. No. 3,846,783 issued to Aspell et al. on Nov. 5, 1974, it is known to provide a pager with a hard copy printout utilizing a thermal print head. As discussed in this patent the thermal print head is advanced with the printing of each character. This presents a problem of synchronizing the print head advancement with the read out from the ASCII decoding logic. Not only must synchronization circuitry be supplied, but also the mechanical stability of the system must be such as to accomodate a moving print head or moving tape which is indexed with the printout of each character of the message. This not only requires complicated indexing of the print head relative to the printing medium, or vice versa, but also requires bulky drive apparatus which draws excessive current. As will be described, in accordance with one aspect of this invention, the subject invention utilizes a "printing-on-the-fly" technique which utilizes a fixed print head and a free running tape to eliminate the necessity of synchronism between the print head and the recording tape. This system obviously, therefore, eliminates the necessity of indexing.

"Printing-on-the-fly" refers to the continuous movement of the printing medium past a print head without indexing the head with respect to the printing medium, or vice versa. While printing-on-the-fly has been accomplished before with thermal print heads as illustrated in U.S. Pat. No. 3,777,116 issued to Riccardo Brescia and Lucio Montanari, its adaptation to a hand held pager is unique. One of the reasons for the uniqueness of this application is the problem of power drain from the batteries by the tape drive itself. Where power is plentiful, printing-on-the-fly is not a problem because the tape drive speed may be made substantially constant. However, in a battery powered operation, especially when the batteries are small, such as in pagers, battery voltages vary widely. In the past, in battery powered tape drives extra circuitry has been utilized to stabilize the speed of the motor in view of the start-up voltage transient as well as variation in the battery voltage with constant high drain. This has been accomplished most notably in the pocket cassette-type tape recorders which utilize magnetic tapes and audio signals. However, the "printing-on-the-fly" technique as described herein obviates the necessity for complicated and, in some instances, excessive power-draining motor drive control circuits because it is a finding of this invention that the speed of the tape drive motor may vary by as much as 50% and still produce a readily readable message. Hence, there need be no indexing of the thermal print head with respect to the paper and, more importantly, there need be no special control of the speed of the tape drive motor. This lacks of synchronism and lack of criticality has been discovered and lies at the heart of providing an exceptionally simple hard copy, long life pager. Messages samples with various tape drive rates are illustrated hereinafter to illustrate the range of speeds acceptable and thus the lack of necessity of tape speed control.

Printing-on-the-fly, therefore, eliminates the necessity for indexing equipment which eliminates reliability problems, cost, and, in some instances, excessive power drain in battery powered units. The subject system is extremely reliable due to the lack of criticality between the tape movement and the printing speed.

It will be appreciated that the subject battery powered pager using the print-on-the-fly technique differs from the spacecraft teleprinter of U.S. Pat. No. 3,476,877 issued Nov. 4, 1969 to P. E. Perkins et al. in that there is no true addressing and thus no true paging function in the Perkins et al. system. More importantly, the Perkins et al. device indexes the tape with respect to the thermal print head, which approaches is rejected in favor of the print-on-the-fly technique described herein. While satellites may be battery powered, power is not a problem due to the use of solar cells and thus the extra power drain and complexity of a stepping motor and drive circuitry of the Perkins et al. system can be tolerated, especially where the satellite is considerably larger than a personally portable pager. For personally portable pagers however, space and power are at a severe premium. Moreover pagers are subjected to more physical abuse than satellite circuitry. Thus the reductions of power drain and mechanical complexity afforded by printing-on-the-fly offer unusual advantages to a pager system. While the print-on-the-fly pager is the subject of this patent, several entire paging systems will be described hereinafter to point up the types of systems to which the subject invention is applicable and to contrast it with other systems.

It is therefore an object of this invention to provide a pager with a printing system in which there is continuous relative movement between the printing head and the printing medium without significant distortion of the printed characters.

These and other objects of this invention will be better understood in connection with the following description in view of the appended drawings in which:

FIG. 1 is a diagrammatic representation of a hard copy pager;

FIG. 2 is a block diagram illustrating the printing system utilized by the hard copy pager in FIG. 1;

FIG. 3 is a diagrammatic representation of a thermal print head for use in the pager of FIG. 1;

FIG. 4 is a diagrammatic representation of a portion of the tape which has been printed by the apparatus contained in the pager of FIG. 1, illustrating the segmenting of a character into five vertical sections with the printing of the character being accomplished by actuation of vertically arranged printing elements during continuous relative motion between the tape and the print head;

Figure 6:
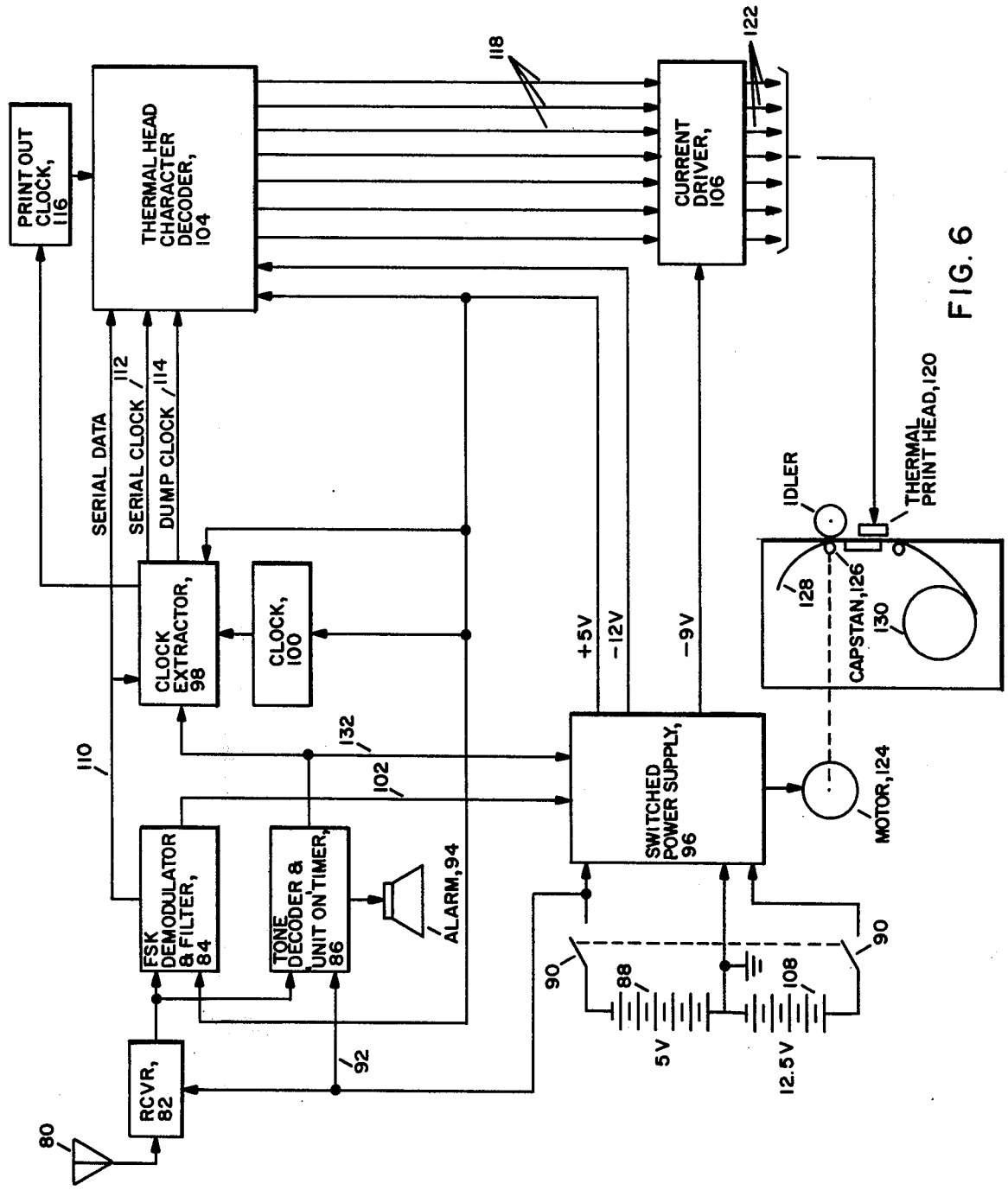
Figure 7:
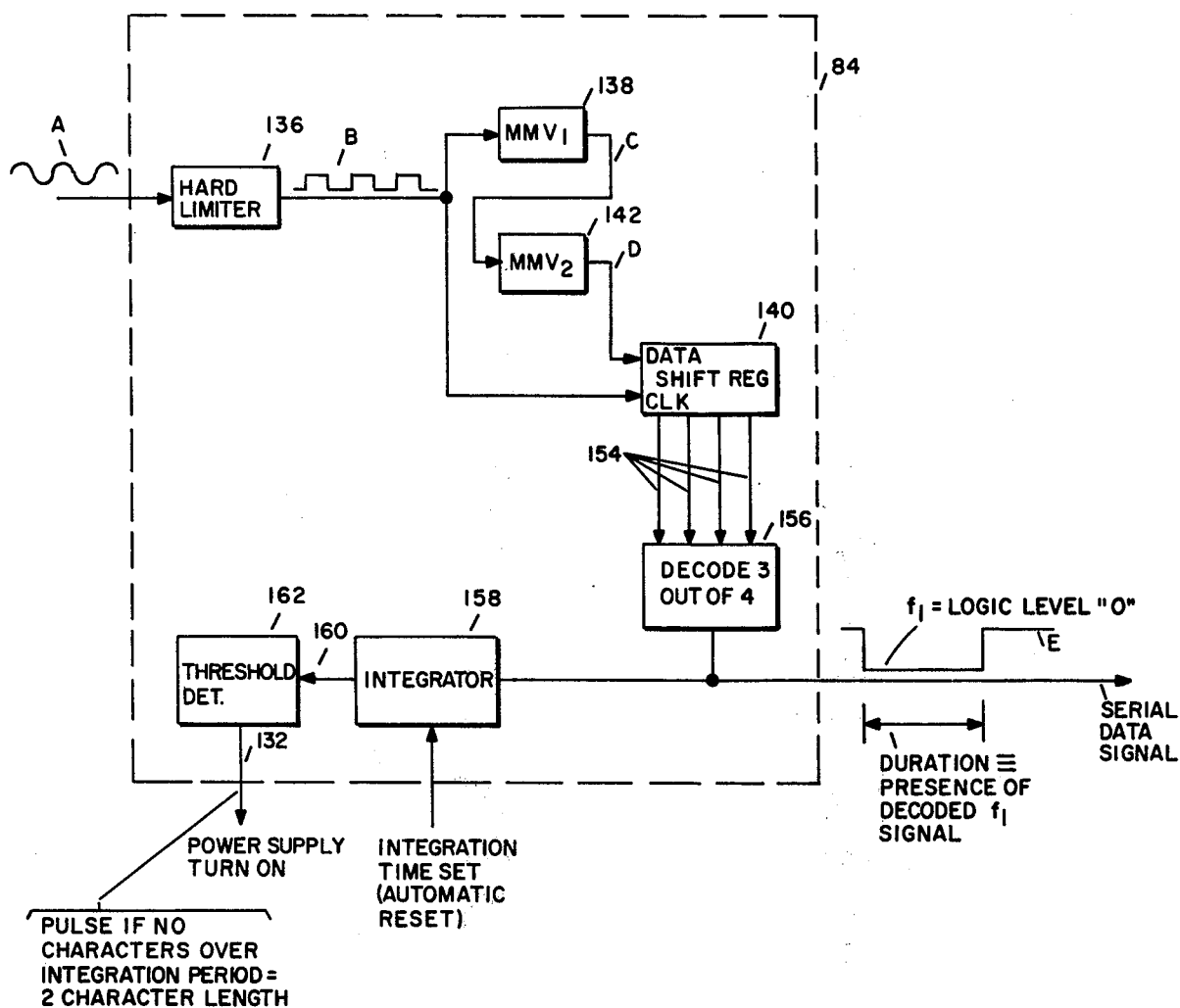
Figure 8:
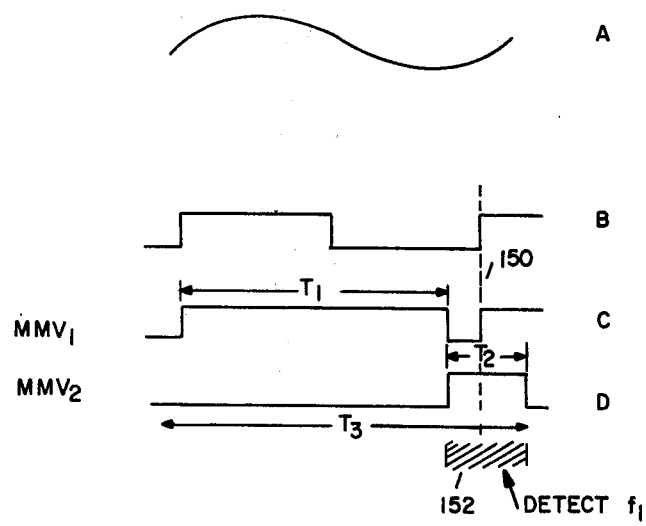
Figure 9:
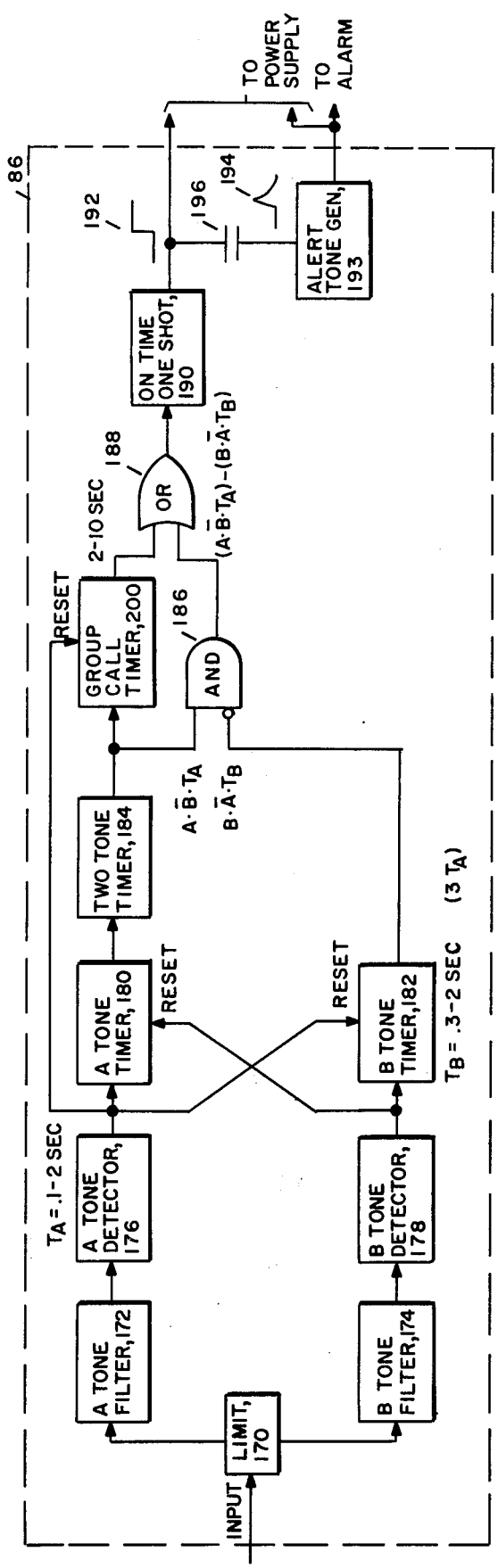
Figure 10:
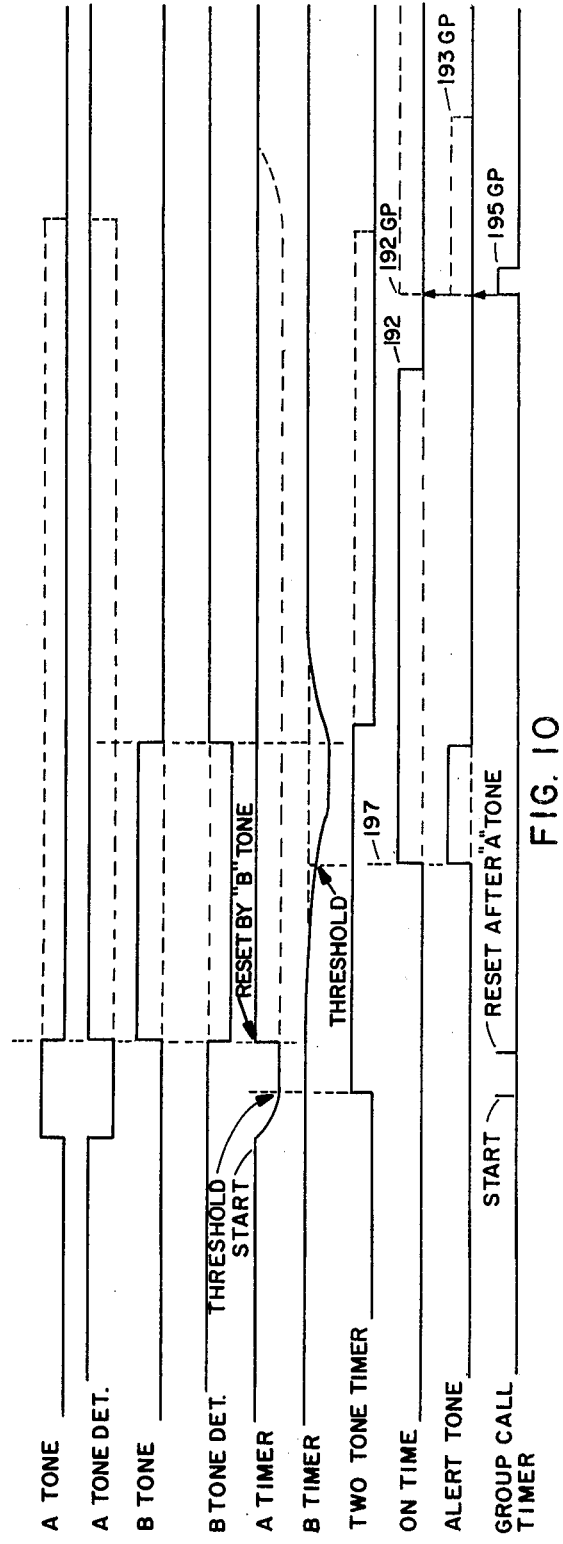
Figure 12:
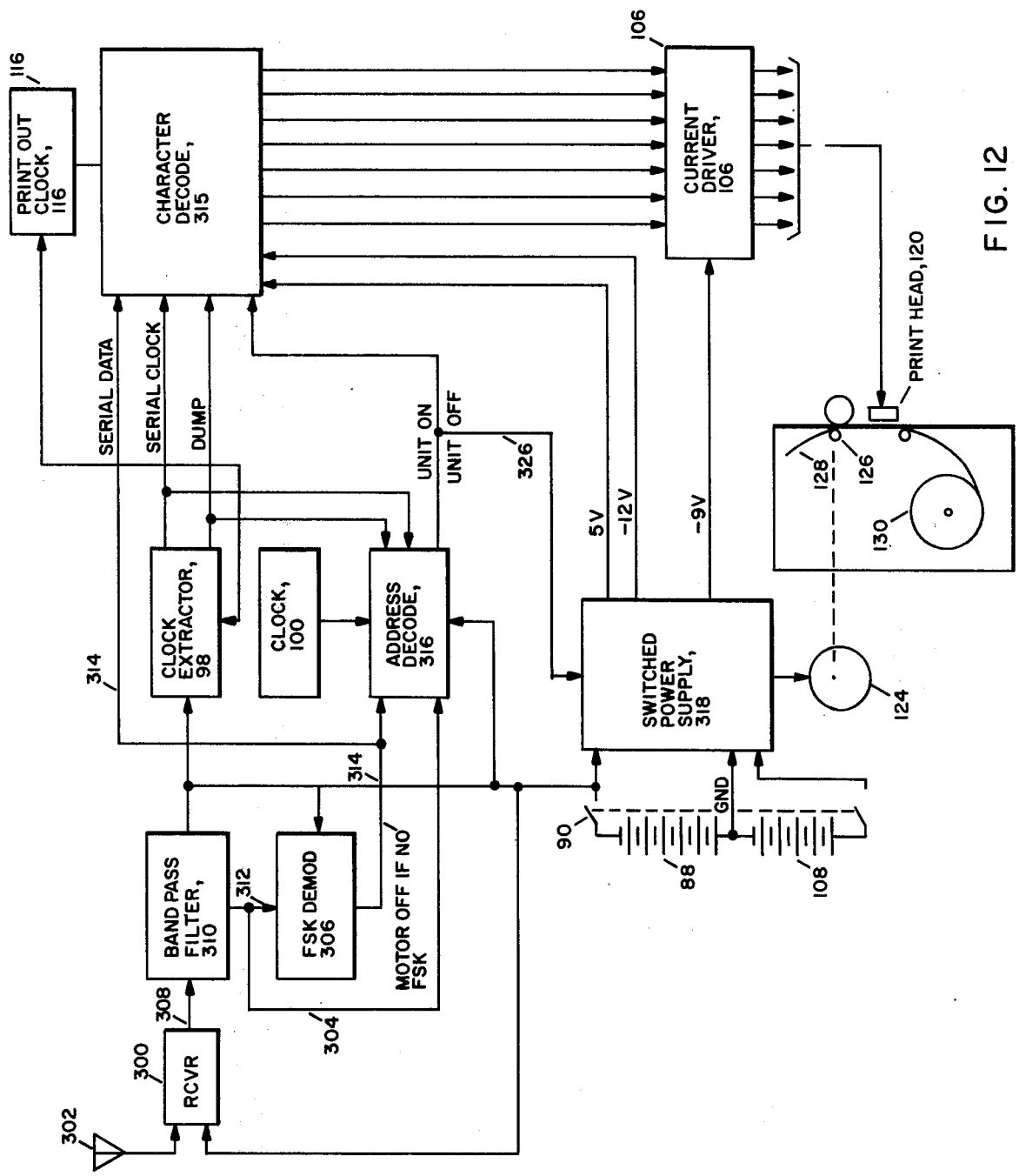
Figure 13:
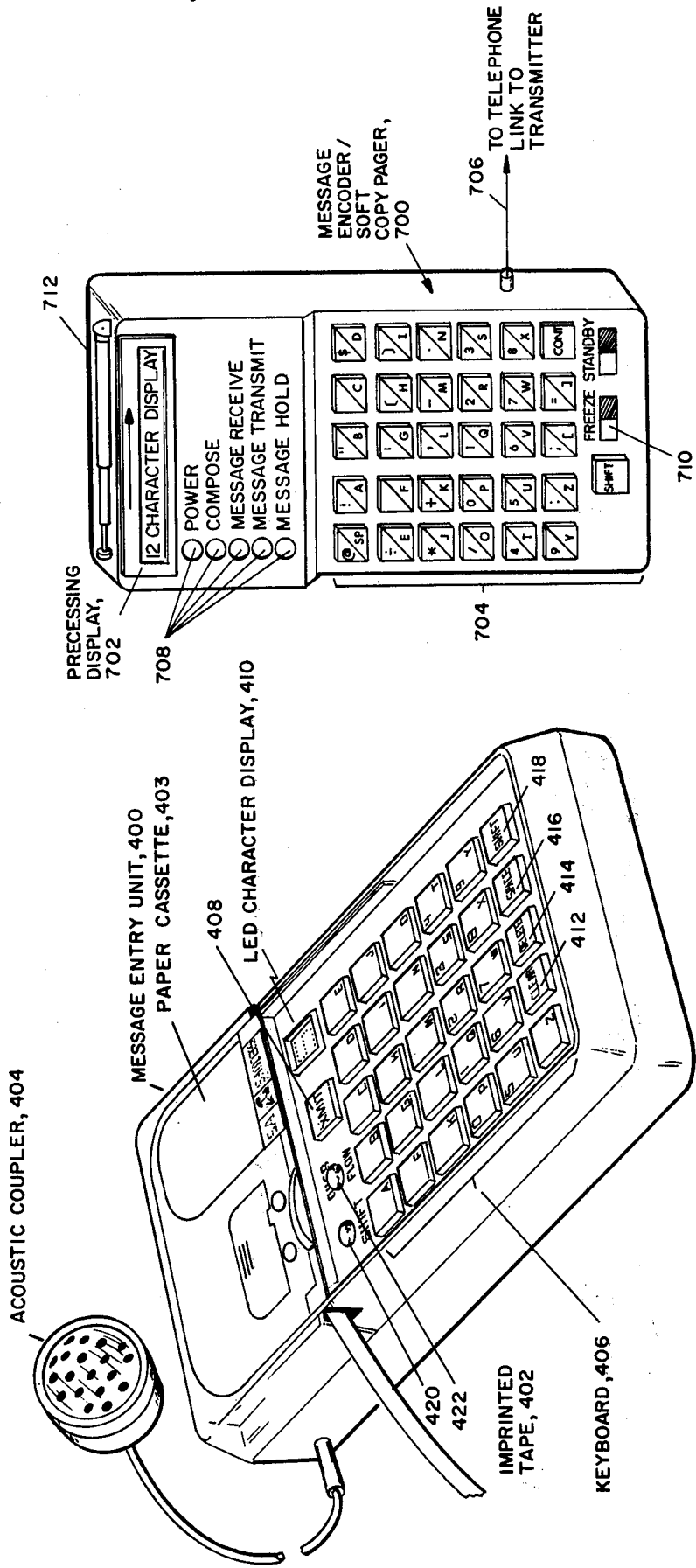
Figure 14:
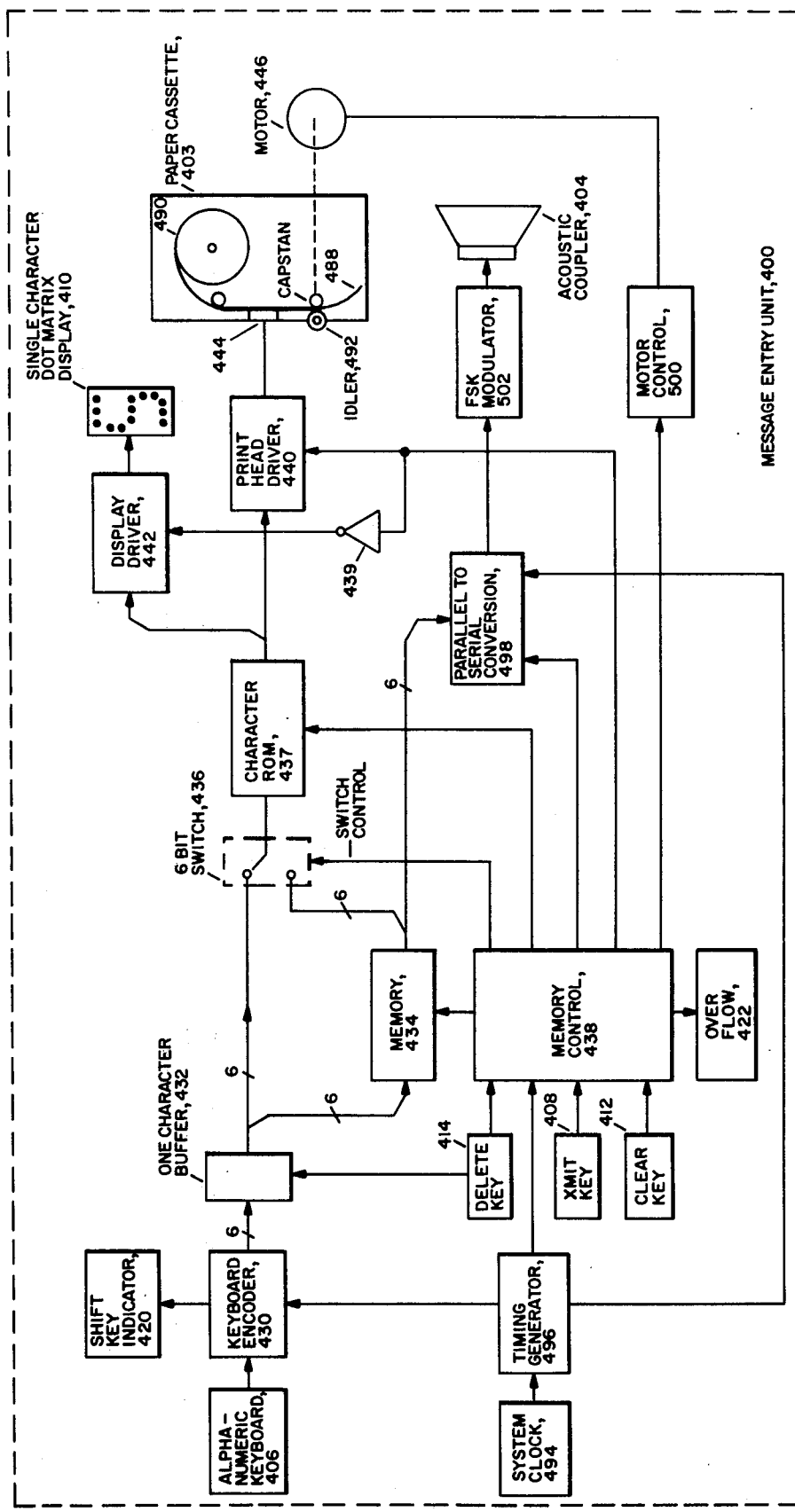
Figure 15:
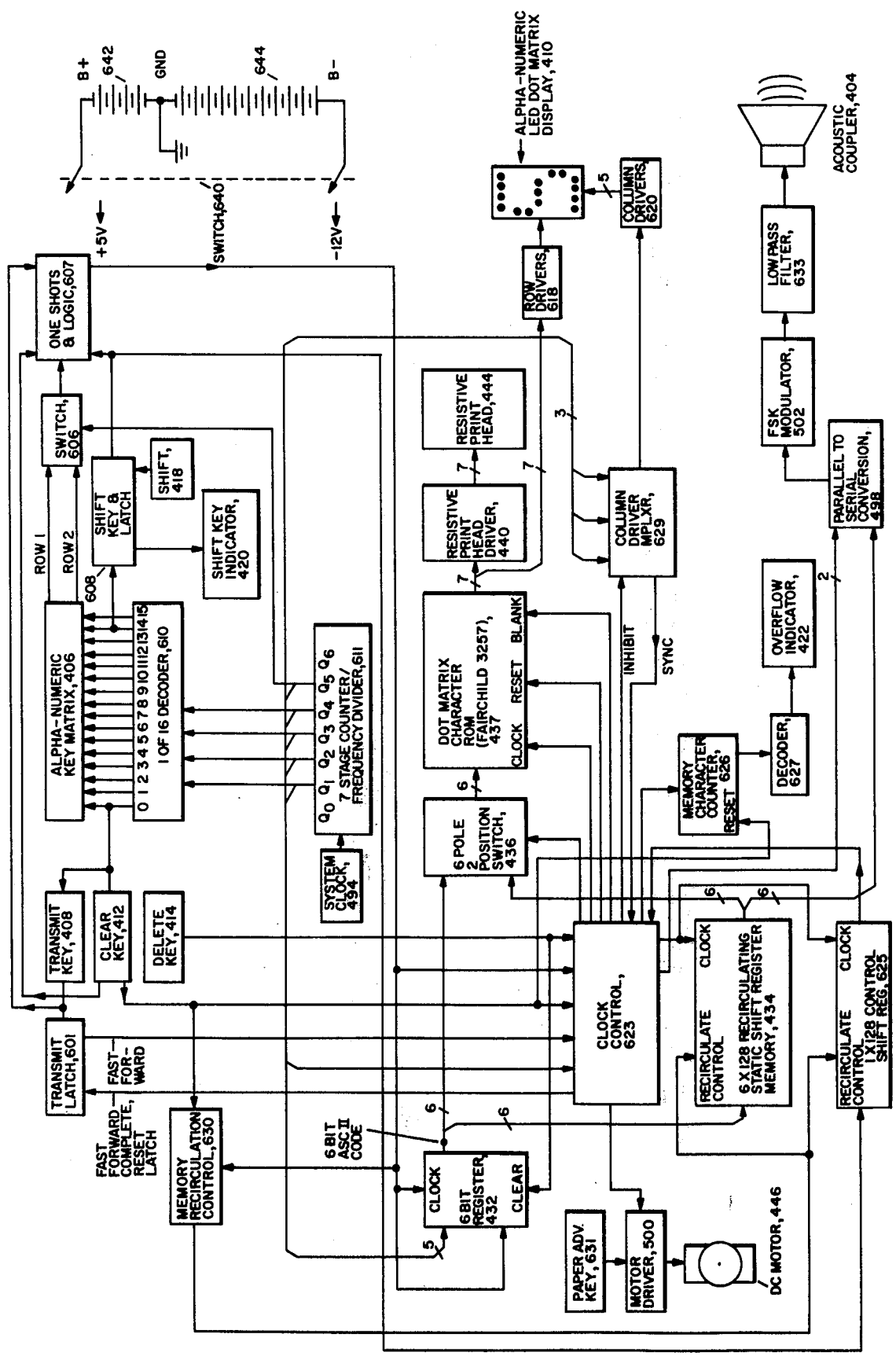
Figure 17:
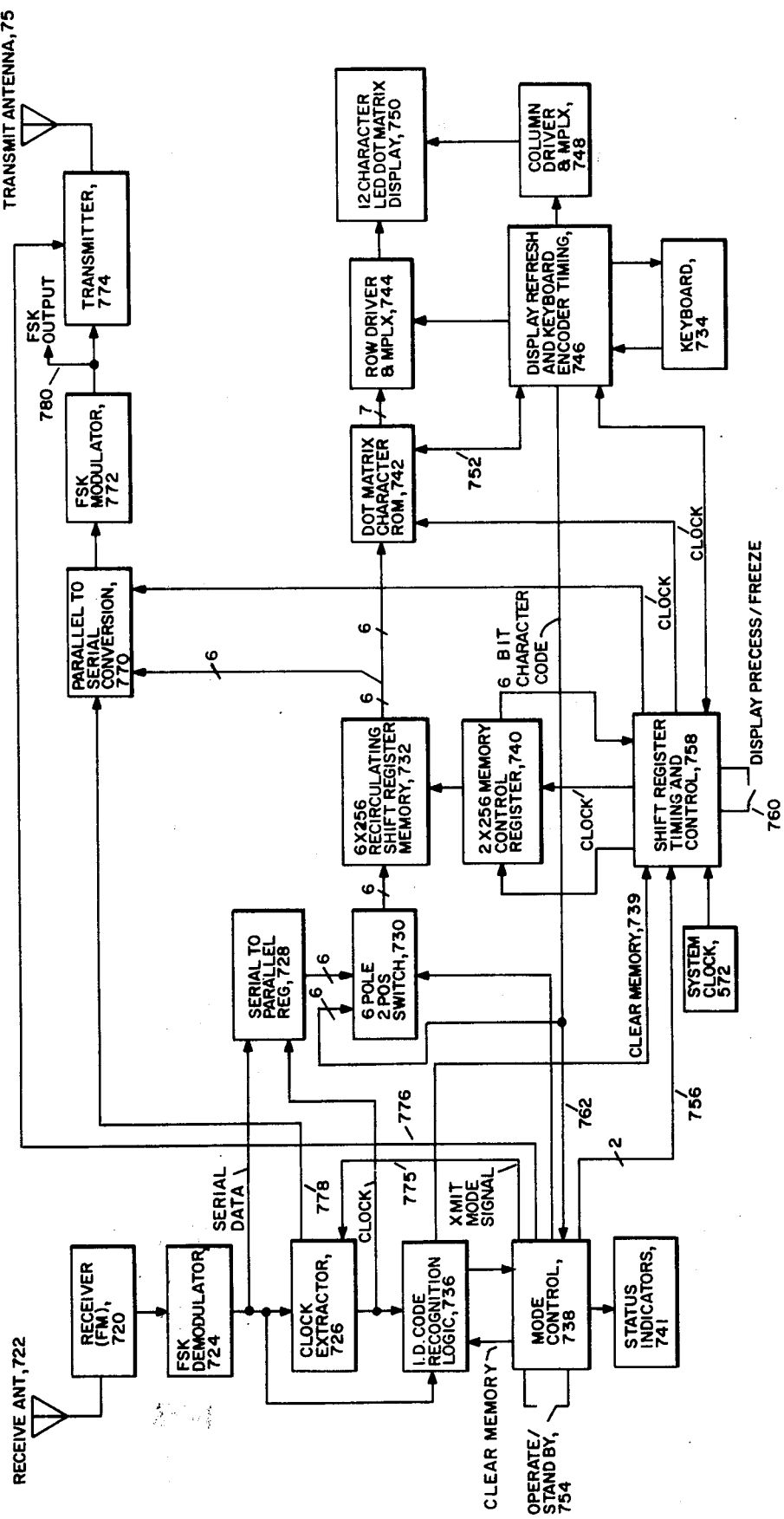
Figure 18:
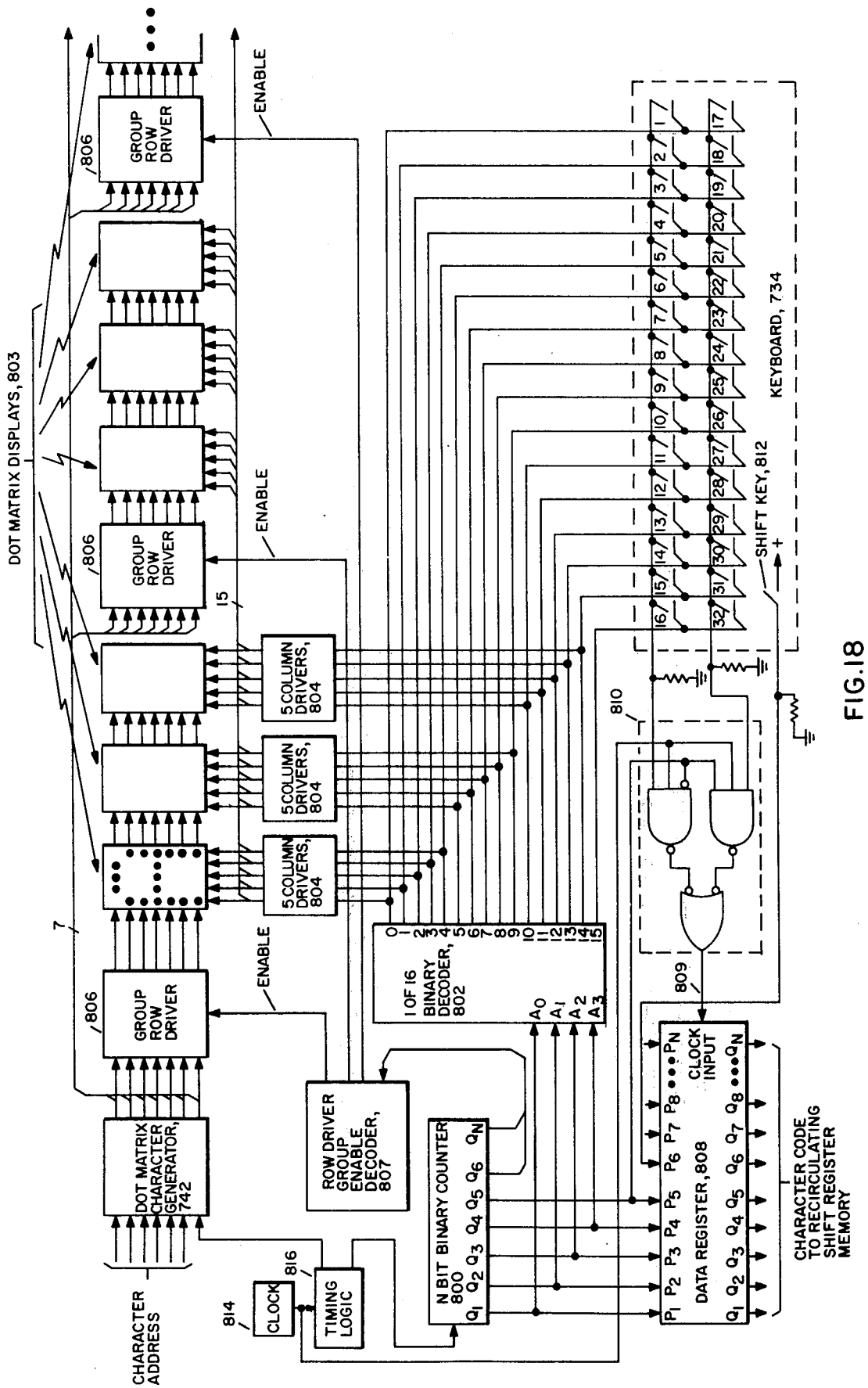

FIG. 5 includes two actual samples utilizing the subject print-on-the-fly technique for two different tape speeds;

FIG. 6 is a block diagram of the hand held pager in which the tone control address decoding is utilized;

FIG. 7 is a block diagram illustrating the subject demodulator/ filter utilized in the FSK data transmission decoding for the subject pager;

FIG. 8 is a waveform diagram illustrating several of the waveforms available from the circuit of FIG. 7;

FIG. 9 is a block diagram of the tone decode circuit of FIG. 6;

FIG. 10 is a timing diagram for the tone decode circuit of FIG. 9;

FIGS 11a–11e are detailed schematic diagrams of the circuit of FIG. 6;

FIG. 12 is a block diagram of a pager utilizing a digital address decoding system instead of address tone coding;

FIG. 13 is a diagrammatic representation of a message encoder for use with the subject pagers;

FIG. 14 is a general block diagram of the message encoder of FIG. 13;

FIG. 15 is a more detailed block diagram of the message encoder of FIG. 13;

FIG. 16 is a diagrammatic representation of a soft copy pager/message encoder combination which utilizes a precessing display;

FIG. 17 is a block diagram of one embodiment of the pager/encoder of FIG. 16; and FIG. 18 is a more detailed block diagram of a portion of the pager/encoder of FIG. 17.

DETAILED DESCRIPTION

Referring to FIG. 1, one version of the subject paging system is illustrated as including a hand held unit 10 which may be carried by the potential message recipient either on a belt, in a briefcase, or in a pocketbook, etc. The pager illustrated in FIG. 1 is the receiving and readout unit of the subject system and includes a replaceable tape dispenser 12 to dispense tape 14 past a thermal print head 16. The tape is driven by drive apparatus generally indicated by reference character 18, and is threaded through a channel 20 which is defined by a portion of the pager housing 22 and a removeable transparent cover 24 which slips over a top portion of housing 22. It will be appreciated that in the embodiment illustrated, the tape exits the housing at a point 26 from which point it is wrapped around the top portion of housing 22 and is allowed to run free of the housing at a point 28 which is defined by the lower edge of the transparent cover. This lower edge also serves as a cutoff blade for cutting off imprinted tape. An alternative path for the tape is via channel 30 to the lower side of a deflecting member 32 and out slot 34 in cover 24. A snap on tape collecting housing 29 may be provided to prevent tape fouling, when for instance the pager is carried in a briefcase where other objects may prevent tape exit. Additionally, a slot 36 is provided in cover 24 to expose a two position ON/ OFF switch 38 when the transparent cover is in place. Alternatively, this switch may be a three position switch; ON, OFF and PAPER ADVANCE. The PAPER ADVANCE position is for tape threading and message removal.

In operation, a message to be transmitted is encoded with the particular address of the chosen recipient and is transmitted from a central location to the hand held unit 10. Upon receipt of the appropriate address and decoding thereof, the tape drive of the pager may be continuously run for a predetermined length of time corresponding to the maximum length message allowed by the system and the message is imprinted on the tape via the thermal print head and message decoding electronics within the pager. Alternatively, a deactivation circuit may be provided which detects the cessation of transmitted characters and deactivates the tape drive approximately ½-1 second after the last message character.

The importance of this circuit feature is that it conserves paging unit power. The additional one second or so of paper drive permitted following the last character provides sufficient time for the last printed character of the message to be advanced from the print head area to the viewing area. The tape upon being driven progresses in the direction of arrow 40 such that long messages will be available adjacent the hard copy pager outside of the case. Short messages are displayed through the transparent cover as illustrated in FIG. 1.

It is an important feature that the hard copy pager may be left unattended. Thus, in general, the paper includes a memory in the form of a tape for storing the transmitted message until it is convenient for the recipient to acquire the information in the message. This frees the recipient from the necessity of transcribing an oral message while he may be otherwise occupied and unable to do so.

From a generic point of view, therefore, the subject invention broadly includes storing the transmitted message at a hand held unit in the vicinity of the recipient from readout either instantaneously or at a later time. It will be appreciated that the pager may be provided with an alarm circuit which notifies the recipient that his pager has been addressed and that there is a message waiting. The manner of storing the message may take on various forms, the simplest of which being the above mentioned tape which carries alpha/numeric characters thereon. As will be appreciated the memory may also be any one of a number of conventional electronic memories utilized to drive an alpha/numeric display. As illustrated in FIG. 16, and described hereinafter, the stored message may be displayed by a precessing alpha/numeric display consisting of a matrix of light emitting diodes, liquid crystals or the like.

Thus the problem solved by the local storage of the transmitted message is one of the inconvenient arrival of the message. Also, the message is received silently and can only be received by pagers having message demodulators thus, limiting access to the message. In the subject invention local means are provided for storing the message and for reading it out at the appropriate time. In a preferred embodiment a record is made of the message through the provision of hard copy via the imprinting of a tape.

Referring now to FIG. 2, in general the paging system may include a transmitter 50 to which is coupled a message composing/addressing unit 52. The transmitter may be high power and remotely located with coverage over a wide area. Access to the transmitter is conventionally obtained by dialing the facility to gain ascess to the transmitter. The number called contains the appropriate address which unit 52 converts to the appropriate address tones. Next, the message is encoded either at the transmitter or at the location of the person who dialed the number. For purposes of description, the message transmitted is a two tone ASCII code frequency shift keying (FSK) message, it being understood that phase shift keying (PSK) or differential phase shift keying (DPSK) may also be used as well as other types of modulation. If the message is entered at a point remote from the transmitter, a portable FSK tone generator and message encoder is accoustically coupled to the telephone line and then directly to the transmitter.

Transmitter 50 braodcasts the address tones followed by the FSK message tones to a receiving, addressing decoding, message decoding and print head drive unit 54. Upon decoding of the appropriate address a control unit 56 actuates motor 58 to drive capstan 59, which pulls tape 14 from spool 12 past thermal print head 16. As is conventional, a idler 60 is provided. The tape then moves between thermal print head 16 and a heat absorbing material 62, such as felt, which improves the resolution of the print head by dissipating heat. In one embodiment described hereinafter, the motor and print head drive are shut down after the message has been received by sensing the lack of FSK signals. This eliminates the necessity of an end of message signal. Switch 38 of FIG. 1 may then be used to advance the tape out of the vicinity of the print head so the message can be read.

In the preferred embodiment as will be appreciated, in order to simplify the circuitry within the pager and to reduce power requirements and complexity thereof, it has been found that during printing, the printing medium may be moved at an uncontrolled speed continuously relative to the printing head without any significant degradation of the hard copy. In the past indexing of either the printing head or the printing medium is provided so that a clear alpha/numeric character may be imprinted. This, of course, requires considerable synchronization and power draining electronics which is deliterious to the miniaturization of the entire system where power and space are at a premium. It has been found that considerable latitude in speed can be tolerated with a print head configured as follows.

Referring to FIG. 3, the print-head may be easily fabricated with printed circuit board techniques in which a printed circuit board 70 is mounted on a heat sink 71 of copper. The printed circuit board is etched to provide resistive elements 72. In one embodiment the thermal print head resistive elements are 15 mills square. On each side of the resistive element is a conductive stripe, stripes 74 and 76, which transmit power to the particular resistive element utilized in the formation of a character. During energization, the resistive element heats up sufficiently to cause a mark to be transcribed onto a thermal print tape. In one embodiment the print tape is available as 3M Model No. 161 Black, on which a black mark is produced when the temperature of the printing element thereat exceeds 90° C.

In one embodiment as illustrated in FIG. 4 the print head utilizes 7 resistive elements in a vertical column to produce a portion of the character desired. In this embodiment each character is formed by 5 successive actuations of the print head thereby to form the character by 5 successive columns. As illustrated in FIG. 4 the character "R" is formed by sequentially actuating elements 1 through 7 of the print head in the first time interval, elements 1 and 4 in the second time interval, elements 1, 4 and 5 in the third time interval, elements 1, 4 and 6 in the fourth time interval, and elements 2, 3 and 7 in the fifth time interval. It will be appreciated that the arrows above the figure indicate the five columns and therefore the five time intervals for the formation of a character. As illustrated by arrow 78, the tape is moved continuously past the print head during the five time intervals. The print cycle in one embodiment comprises 6.8 milliseconds for printing a column with a cool down time of 6.8 milliseconds. between columns.

Ordinarily, it might be thought that there would be considerable blurring of the image with the continuous tape drive provided. However, as can be seen from FIG. 5, characters of more than acceptable clarity are provided at speeds of 0.825 inches/second and 0.475 inches/second as compared with a column actuation time of 6.8 milliseconds. It will be further appreciated from FIG. 5 that the increasing of the speed of the tape merely results in a stretching out widthwise of the alpha/numeric characters imprinted. Thus, the tape speed is not critical, and the tape need not be indexed in order to provide legible characters.

Because of the continuous tape drive and the lack of indexing, power is conserved and the complexity of the pager is minimized. A hard copy of the message is thus provided which may, amongst other things, serve as a record of the receipt of the message as well as for recording the content thereof.

Referring to FIG. 6 a block diagram of one embodiment of the subject invention is illustrated. In this embodiment, a tone control address system is utilized along with the aforementioned thermal print head and the printing-on-the-fly technique. In this embodiment transmitted signals are received by an antenna and input circuit 80 coupled to a receiver 82. The output of the receiver is coupled both to an FSK demodulator and filter 84 and a tone decoder and unit ON timer 86. The output from the receiver includes the tones transmitted on the carrier, e.g., the address tones followed by the FSK tones. In a preferred embodiment the address tones are different from the FSK tones. Power for the receiver comes via an internally contained battery 88 through a switch 90 when the paging unit is turned ON. It will be appreciated that power is therefore continually supplied to receiver 82 and also via line 92 to the tone decoder and unit ON timer 86. The output of tone decoder and unit ON timer 86 is applied to an alarm 94, which may be any one of a number of alarms including an audible alarm, and/or visual alarm. This output is also applied to a switched power supply 96 and to a clock extractor circuit 98 which provides clocking pulses of an appropriate variety from system clock 100. Tone decoder and unit ON timer 86 upon decoder of a predetermined address transmits a signal on line 102 to switched power supply 96 and clock extractor 98 to turn ON both of these units. Switched power supply 96 then delivers power to the FSK demodulator 84, clock 100, a thermal print head character decoder 104, and a current driver 106. Power for the switched power supply is derived from the two internally contained batteries 108 and 88 which in this embodiment delivers 12.5 volts and 5 volts to the system.

In operation, upon receipt of a carrier modulated with the appropriate address tones the tone decoder and unit ON timer 86 initiates a pulse which switches ON power supply 96. Power is then supplied in one embodiment to the FSK demodulator and filter 84 which may be of a special design to permit decoding via sensing of only one of the two FSK tones. This demodulator and filter will be described in connection with FIGS. 7 and 8. The output of the FSK demodulator and filter 84 is delivered over line 110 as serial data to the thermal print head character decoder 104 which includes a read only memory (ROM) described in connection with FIG. 11. Clock extractor unit 98 at the same time provides a serial clock signal for the character decoder to clock in the serial data into a serial to parallel shift register and also a dump pulse, over lines 112 and 114 respectively. A printout clock 116 is also provided such that when a pulse is applied on line 114 to dump the contents of the serial to parallel shift register into a single character buffer register, the character decoder is read out responsive to printout clock 116 over 7 output lines 118 to current driver 106. In one embodiment, each character which is read out in five sequential segments, seven dot elements per segment, the seven lines 118 corresponding to the seven elements per segment for the production of a five segment character via thermal print head 120. The printout clock therefore enables the five column readout after receipt of a pulse from the dump clock. It will be appreciated that lines 118 actuate switching circuits within the current driver such that high currents are applied to lines 122 for the driving of thermal print head 120.

Simultaneous with the switching ON on power supply 96, drive motor 124 is actuated to drive capstan 126 for moving tape 128 from reel 130 past the thermal print head. The tape is moved continuously past the thermal print head for a period of time governed by the unit ON timer 86 which in turn is governed by the length of the message. In one embodiment the pager is turned OFF upon sensing of the end of the FSK message. In order to accomplish this in one embodiment an output pulse is derived from the FSK demodulator and filter 84 which is transmitted via line 132 to turn OFF power supply 96 at the end of an FSK message. A circuit is provided in the FSK demodulator which senses the absence of FSK tones and produces this pulse thereby to switch OFF all elements in the pager with the exception of receiver 82 and tone decoder 86. This is accomplished without the aid of an "end-of-message" signal. The FSK demodulator will be described in general with connection with FIGS. 7 and 8 while the tone decoder and unit ON timer will be described in connection with FIGS. 9 and 10.

Referring now to FIG. 7 a block diagram of FSK demodulator and filter 84 is presented. The demodulator includes a hard limiter 136 to which an input signal, herein designated as waveform A, is applied. The hard limiter produces a pulse train, waveform B, which is supplied to a first monostable multivibrator 138 and a shift register 140 as the clocking signal for the shift register.

Multivibrator 138 is a one-shot multivibrator of a monostable multivibrator which is actuated on the positive going edge of a pulse from the hard limiter and has a time period set for the minimum period of a signal which will be recognized as the 1070Hz tone (the logic 0 or "space" tone in transmission). While the 1070 Hz space tone is standard, the subject system can be set to respond to tones of any frequency. The output of the first monostable multivibrator is illustrated by waveform C and is applied to a second monostable multivibrator 142 which has a period such that the total period between the actuation of the first monostable multivibrator and the termination of the pulse from the second monostable multivibrator is the maximum period of a signal which will be recognized as the 1070 Hz tone. The output of the second monostable multivibrator is illustrated by waveform D. The difference between the minimum and maximum periods defines the permissible period measurement error for the FSK system.

As indicated, the outputs from monostable multivibrator 142 and hard limiter 136 are applied respectively to the data and clocking inputs of a conventional shift register. Referring to FIG. 8, as can be seen, waveform A is converted into a pulsed wavetrain B. Monostable multivibrator 1 is triggered by the positive going portion of waveform B and pulse C times out at the end of a period $T_1$. When the first multivibrator times out the second multivibrator is triggered to time out at the end of a period $T_2$ as illustrated. $T_1$ is the minimum period for recognizing a tone and $T_1 + T_2 = T_3$ is the maximum period for recognizing a space tone. In one embodiment the positive going edge of the wave train representing a tone having a frequency of 1070 Hz $\pm$ 50 Hz must lie in the $T_2$ time period. In effect, therefore, the edge of waveform B illustrated by dotted line 150 must lie somewhere in time interval $T_2$ in order to be detected as the space tone having a frequency of 1070 Hz. The output of the second multivibrator in effect provides a gating pulse such that a rising edge of waveform B must occur during this gating pulse in order for the incoming signal to be recognized as a space tone. Thus the rising edge must occur in the shaded portion 152 in orer to be detected as a space tone. This system, therefore, provides detection of one of the two tones used in the FSK decoding system and provides a filter such that the positive going edge of the hard limited signal must appear during a predetermined gating window to be recognized as a space tone. The gating is accomplished by the clocking of shift register 140 with the output from the hard limiter 136 and providing that the output of the second multivibrator, e.g., waveform D, be shifted down the shift register with the clocking pulses, which are the pulses from the hard limiter 136. In one embodiment the shift register includes a number of D flip flops. If the data signal is a logic lever 1 at the clock edge then the $q_1$ output of the first D flip flop will go to a logic 1 and the previous information on $q_1$ is transferred to the next flip flop. Conversely, if at the time of the clock edge the output from the second multivibrator is 0 then the $q_1$ output will be 0 indicating that the received tone frequency was outside the acceptance window. In one embodiment this shift register may be a 4 bit shift register with 4 D flip-flops. Coincidence between the clocking pulse edges and the gating pulses from the second multivibrator therefore produces a logic level 1 output at an appropriate output line 154 from shift register 140. Decode unit 156 in one embodiment is a three out of four majority gate which detects the presence of logic 1 output levels on three out of four lines and produces an output signal in response thereto, the signal being labelled by reference character E. The three of four majority gate provides some noise immunity for the demodulator be permitting an occasional incorrect period measurement by the monostable multivibrators while maintaining a logic 0 output. The duration of this signal at a logic level 0 is equivalent in duration to that of the decoded space tone minus one period duration of input signal A. It will be appreciated from the diagram of FIG. 7 that the output of the decode unit 156 is at a logic level 1 for all other times than that at which the space tone is decoded. Waveform E therefore provides the serial data signal utilized by the thermal print head character decoder 104 of FIG. 6.

What will be appreciated is that by the use of this technique the multivibrator system decodes one tone with a high degree of selectivity, with a second degree of selectivity being provided by the decode unit.

The output of decode unit 156 is also coupled to an integrating circuit 158 having a preset integration time and an automatic reset feature which results when the power to the demodulator is cut off at the end of the message. It will be appreciated that when the FSK signalling ceases the output of decode unit 156 will be high. When integrated over a given period of time, the output of the integrator 160 will continue to rise in the presence of this high output. A threshold detector 162 detects a predetermined level from the integrator and produces a power OFF signal on line 132 when this predetermined level has been reached. Thus the presence of FSK signals prevents the integrator output from reaching this predetermined level since the output of decode unit 156 will drop during the FSK transmission. This prevents the integrator output from reaching the predetermined threshold level. However, a predetermined time after the cessation of the FSK signals the integrator output will rise to the predetermined threshold and the power will be turned OFF. This will turn OFF all circuits except the receiver and tone decoder. Upon receipt of a second message, unit 84 will be turned ON and integrator 158 will be reset to zero with the first decoded space tone of the message. After the end of the message the output of the integrator 158 will again reach the predetermined threshold and the pager will be shut off. Another way of looking at integrator 158 is to consider it as reducing its integration count in response to a logic level 0 signal while increasing its integration count in response to a logic level 1 signal. On the average, during an FSK transmission the integrator output would be zero. This integration output thus rises to some predetermined level in the absence of an FSK transmission. Alternatively, as described before, the integrator may be of a conventional type which merely integrates logic level 1 signals from decode unit 156, with the only difference being the level at which the threshold detector is set.

Turning now to FIG. 9, a detailed block diagram of the tone decoder and unit ON timer 86 is presented. In one embodiment an input signal from receiver 82 of FIG. 6 is applied to a hard limiting circuit 170. The output of the limit circuit is applied to a tone A filter 172 and a tone B filter 174. These filters may be of an electro-mechanical variety such as a tuning fork filter, with each of the filters tuned to a different predetermind address tone in the audio range. These tones are different from the FSK tones described in connection with FIG. 7. The output of each of the filters are connected to tone A detector 176 and tone B detector 178 respectively. These decoders normally produce a logic level 1 output signal. Upon receipt of the requisite tone, the outputs of these detectors go to a logic level 0 for the duration of the tone. The output of the tone A detector 176 is applied to a tone A timer 180 having in one embodiment a timing period of between 0.1 and 2 seconds. This period starts with the arrival of the A tone. The output voltage from the timer decreases during the presence of the A tone. This signal reaches a predetermined threshold after a time has elapsed during which the A tone is present but prior to the end of the A tone. If the A tone ends prematurely, then the A tone timer will not reach the predetermined threshold, thereby guarding against transient conditions in which an A tone may be present for less than a predetermined time.

The output of the tone B detector 178 is applied to a B tone timer 182 having a timing period between 0.3 and 2 seconds which, in one embodiment, is 3 times that of tone A. The B timer period starts with the arrival of the B tone. As with the A timer, the B timer produces a negative going output signal which reaches a predetermined threshold only after a predetermined time has elapsed but prior to the end of the B tone and operates in the same manner as the A tone timer. Each of timers 180 and 182 are reset via the output from the other of the tone detectors such that the tone A timer is reset by a detected B tone and the B tone is reset by a detected A tone. This is accomplished by discharging the capacitors in the timers. In the absence of an A tone after the B tone, the capacitor in the B tone timer starts recharging when the B tone ceases. The resulting waveforms from the tone A and tone B timers are illustrated in FIG. 10. The output of the tone A time 180 is coupled to a two tone timer 184 which is triggered by the negative going signal from the tone A timer reaching the predetermined negative threshold. The two tone timer effectively reverses the polarity of the negative going A timer signal and elongates it so that it overlaps the expected B timer pulse by producing an elongated pulse.

The output of the two tone timer and the B tone timer are applied to a two input terminal AND gate 186, with the input of this AND gate connected to the B tone timer being inverted. Thus, after an A tone, if a B tone follows, the outputs from the B tone timer and the two tone timer will overlap and a signal will appear at the output of AND gate 186 to indicate this event. This signal is applied to one input terminal of a two input terminal OR gate 188 and then to an ON TIME one shot multivibrator 190 which produces a signal 192 for activating the remainder of the pager-circuitry for a predetermined period of time corresponding to maximum permissible message length.

The output signal from one shot multivibrator 190 is also applied to an alert tone generator 193 in the form of a spiked pulse 194 via a capacitor 196. The characteristic of the spiked pulse is a fast rise time with a slow decay. This generates a decaying beep alarm tone, rather than the conventional rising tone. The alert tone generator is fired with the firing with the firing of one shot 190 which is in turn fired by the B tone timer reaching its predetermined threshold as illustrated by dotted line 197 in FIG. 10.

A group call timer 200 is provided for sensing an elongated A tone which functions as a group call signal. This unit is connected to the two tone timer and is activated by an output signal from this timer. The output of the group call timer is applied to the other input of OR gate 188 such that the dotted signals 192gp and 193gp are formed at one shot 190 and alert tone generator 193 respectively.

In operation the normally-high output of the A tone detector is used as a reset signal for the group call timer. When the A tone occurs the reset pulse is removed, only to be replaced when the A tone ceases. During normal addressing this occurs relatively rapidly so that the group call timer is inactivated with the advent of the B tone and remains inactivated. However, if the A tone is elongated for a group call, the group call timer is not reset. The group call timer starts timing responsive to the two tone timer output. A predetermined time thereafter, group call timer produces a pulse 195gp because it has not been reset by the cessation of the A tone as would be the case in the normal addressing operation. The only requirement is that the group call timer be set to produce a pulse prior to the expected cessation of the group call A tone. During a group call, the A timer is not reset by the output of the B tone detector 178 because there is no B tone and this permits the group call timer to keep timing. The timers utilized may all include a capacitor which when either charged or discharged to a predetermined level, results in diode breakdowns to produce the requisite pulse. Resetting may be accomplished by merely removing power.

As can be seen, therefore, the logic operates initially to sense A·B and then B·A to turn ON the power supply and activate the alarm. If the A tone is present for a sufficiently long period of time, the group call timer is not reset and is allowed to time out and produce a group call pulse with the timer period starting from the start of the two tone timer pulse.

Figure 11B:
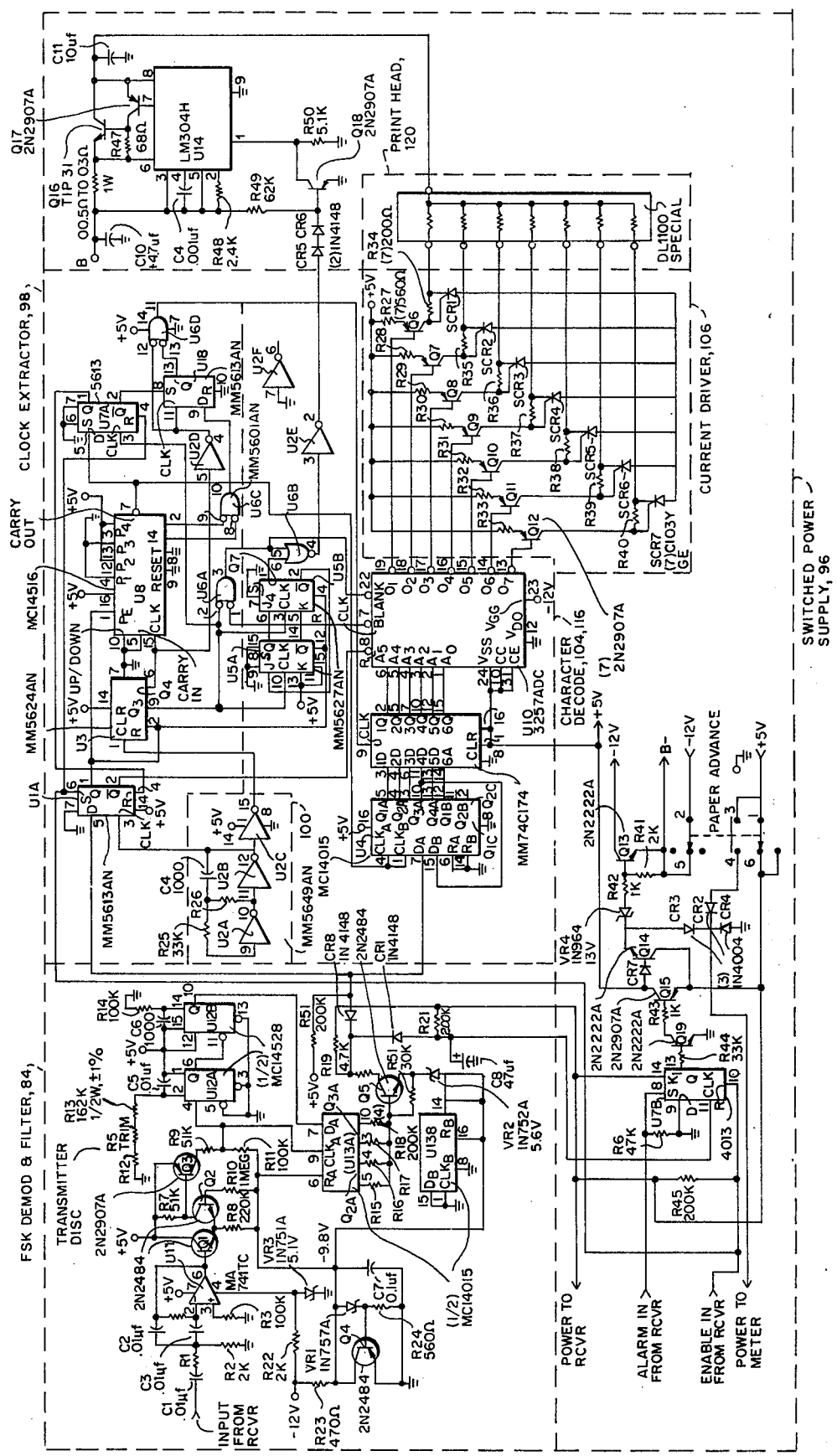

The FIG. 6 embodiment is now described in detail in connection with FIGS. 11a through 11e. Referring now to FIG. 11a, FM receiver 82 derives its input signal at a ferrite loop antenna L1 connected between the base of transistor Q1 and ground. Transistor Q1 is an RF amplifier the output of which is coupled to the base of transistor Q2 which is the mixer for the FM receiver. Transistor Q3 and attendant circuitry provide the local oscillator against which the incoming RF signal is heterodyned. The output of transistor Q2 is fed into a tank circuit including coil L3 the output of which feeds the IF filter F3. The output of the filter is coupled to a second mixer and IF audio stage, U1. This circuit labeled by reference character 201 is described hereinafter in connection with FIG. 11d. The output from the second mixer and IF audio circuit U1 appears at pin 14 and is coupled to the aforementioned tone decode and unit ON timer 86 of FIG. 6 which develops an enable signal and an alarm signal. These signals are coupled to the aforementioned switched power supply 96 of FIG. 6 in order to render the switched power supply operative upon receipt of the correct tone sequence.

Referring again to FIG. 11a, the power amplifier and tone limiter herein designated by the reference character 202 is described in connection with FIG. 11e. It has its input the output of unit U1. The output of the power amplifier and tone limiter 202 is a demodulated and filtered tone signal which is applied to the filters f1 and f2 as illustrated. The outputs of these filters are applied to a tone decoder and group call unit U2 herein designated by the reference character 204 and described in connection with FIG. 11c.

In connection, upon the receipt of the appropriate address, the alarm and enable signals are generated by the tone decoder and unit ON timer to activate switched power supply 96 so that the follow on circuits are actuated. This is accomplished as follows. Referring now to FIG. 11b the enable pulse from pin 11 of the tone decoder and group call unit 204 releases the reset on flip 21 flop U7B which is a "D" flip flop of the type manufactured by RCA Model No. 4013. Simultaneous with the release of the reset on the U7B flip flop the set input of that same flip flop connected to the alarm output of the receiver causes the Q output which is normally at a low level to momentarily go to a high level thereby rendering transistor $Q_{19}$ conductive. This causes the +5 and −12 supply voltages to be turned ON to the logic circuitry and FSK demodulator circuitry and turns ON motor 124 of FIG. 6 as well. It will be appreciated that turning ON of the switched power supply also actuates the current driver 106 which, as can be seen, is switched by a number of SCR's (silicon control rectifiers). As part of the switched power supply it is necessary to render the SCR's non-conductive after they have once been fired. To accomplish this, the switched power supply is provided with a circuit including the unit U14 which is a linear voltage regulator whose reference voltage is switched ON or OFF concurrently with the character decoding. Unit U14 is available from National Semiconductor as model no. LM304H.

After the appropriate address has been decoded, the input from the receiver to the FSK demodulator and filter 84 is applied as described in connection with FIG. 7 to a limiter comprising transistors Q1, Q2, and Q3 and associated circuitry through a band pass filter having a band pass of 1070Hz to 1270Hz. The purpose of the filter is to eliminate a large portion of the broadband noise available at the output of the receiver which might ordinarily interfere with the FSK demodulation process. This bandpass filter is particularly important in view of the particular FSK demodulation system in which only one of the two tones of the frequency shift modulation is detected. This substantially reduces the error rate in the FSK demodulation.

The output of the hard limiter (as described in connection with FIG. 7) is coupled to a first monostable multivibrator herein illustrated as U12A available from Motorola as ½ of an MC14528 chip. Again as mentioned hereinbefore the output of the first multivibrator is coupled to the input of a second multivibrator which, in this case, is the second half of the above chip. The output of the second multivibrator is coupled to the data input of a conventional shift register herein illustrated as the U13A which is available from Motorola Semiconductor as model MC14015. The 3 out of 4 majority logic discussed hereinbefore is accomplished through the use of the weighting resistors R15, R16, R17 and R18. The output ends of these resistors are connected together and coupled to the base of transistor Q5 which is coupled to the −12 voltage through a zener diode VR2. In effect, the zener diode VR2 sets the level at which the majority decision is made. The output of the FSK demodulator is the junction between series connected resistors R19 and R20.

As mentioned in connection with FIG. 7 the FSK demodulator and filter also has circuits coupled to it which sense the end of the FSK transmission. These circuits include diodes CR1, resistor R21 and capacitor C8. It will be appreciated that in the FSK transmission there will occur at least one logic 0 pulse every 100 milliseconds. This prevents the charge on capacitor C8 from rising to a predetermined level which actuates the clock of D flip flop U7B in the switched power supply. Thus, during FSK transmission the D flip flop is not clocked and power is supplied. However, when the charge on capacitor C8 reaches the level at which the clock pulse actuates the D flip flop due to the cessation of the FSK modulation, then the D flip flop of the switched power supply is clocked and the Q output goes to a logic level 0 and power is removed from the FSK decode circuits, the print head driver and the tape drive motor.

The output of the FSK demodulator is coupled to clock extractor 98. The purpose of the clock extractor is to derive a serial clock from the asynchronious FSK serial data for purpose of loading the serial data into a serial to parallel shift register U4. Shift register U4 is available from Motorola Semiconductor as MC14015. The serial data is coupled to pin 7 of this serial to parallel shift register U4, and the serial clock is derived from the output of NOR gate U6D. This is applied to the 1 and 4 input terminals of the serial to parallel shift register. A dump pulse from the clock extractor is applied to the clocking terminal of a 6 bit parallel shift register U9 available from National Semiconductor as Model No. MM74C174. The output of shift register U4 is coupled to the inputs of this last mentioned shift register of the ASCII character code, it having been decoded via shift register U4. The output of shift register U4 is a 6 bit character code word which is coupled to shift register U9 which serves as a data holding register and is clocked at the beginning of each word such that the output from the U9 register remains constant throughout a one word cycle. The output of the U9 register is coupled to a dot matrix character ROM (read only memory) U10 available as Fairchild 3257ADC.

In operation, a word is read out of the U9 register into the ROM during the transmission of a next word. The function of the ROM is as follows: Upon being shown a word from the register U9 and upon provision of the proper clocking inputs, the ROM looks up the appropriate dot pattern sequence for the character represented by the word. The dot sequence is read out one column at a time for a total of 5 columns of dots, plus two columns for intercharacter spacing by internal clocking circuits within the ROM. This clock is identified in FIG. 6 as the print out clock. The clock pulse to pin 7 in one embodiment is a gated and counted down version of the clock pulse delivered to pins 1 and 4 of the U4 register which is derived from U2, U3, U5 and U8. The timing is synchronized with the read in of a word to the ROM such that appropriate look up and read out can be accomplished.

The outputs from the ROM are applied to the bases of transistors Q6 through Q12 respectively which, with respective resistors R27 through R33 comprise switched current sources to activate corresponding SCR gates in accordance with the dot pattern output of the ROM. Upon actuation of a given SCR, the resistor in the print head associated with this SCR is coupled to ground thereby permitting current flow through the resistor which results in heating of this resistor. Unit U14 of the switched power supply is actuated to turn OFF the SCR's at the end of each column utilized in the generation of a character.

Figure 11C:
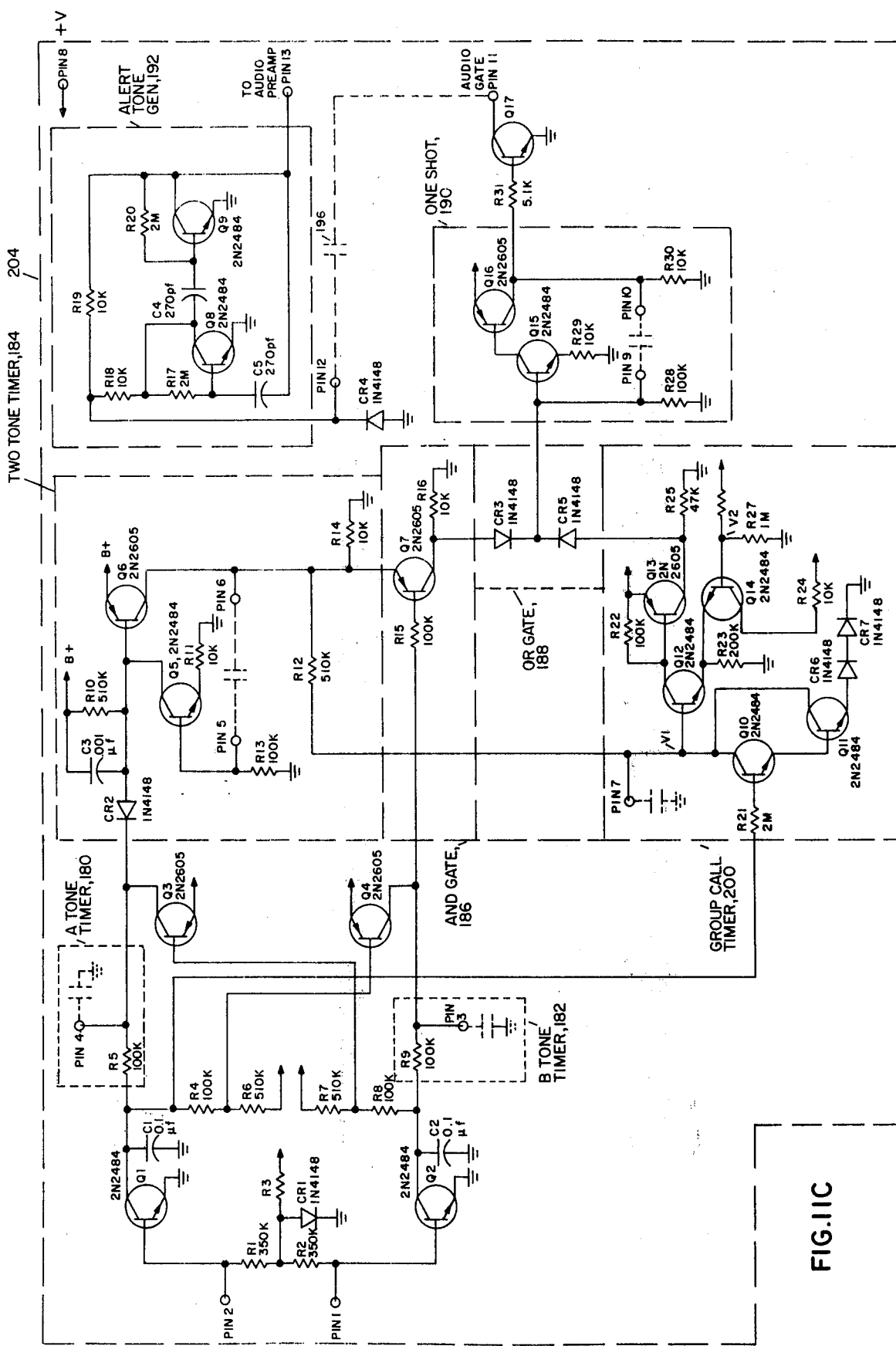

Referring to FIG. 11c, the tone decoder of FIG. 9 is described in greater detail. It will be appreciated that the input to pin 2 of the FIG. 11c circuit is the output of the aforementioned tone A filter whereas the input to pin 1 is the output of the aforementioned tone B filter. These are audio tones. Transistors Q1 and Q2 correspond to the aforementioned tone detectors. The output of the tone detectors occur at the respective collectors of transistors Q1 and Q2. This voltage is applied across capacitors C1 and C2 respectively. In normal operation, without the presence of a tone, transistors Q1 and Q2 are initially nonconducting whereby a high d.c. potential exists at capacitors C1 and C2. An audio input applied to the base of either one of these two transistors renders the transistor conducting, assuming that the audio signal exceeds a predetermined level determined by transistors Q1 and Q2, resistor R3 and diode CR1. It will be appreciated that in this circuit there is no rectification of the audio input signals to provide a reference level. Rather, the reference level is determined by the difference between the voltages on diode CR1 and the voltage required to produce conduction in Q1 and Q2. It will be therefore appreciated that transistors Q1 and Q2 are normally on the verge of conducting and will conduct in the presence of the appropriate audio signal at the base thereof.

The output from transistor Q1 is coupled to an A tone timer comprising resistor R5 and the capacitor from pin 4 to ground noted in phantom. In the absence of the A tone, the charge on the capacitor between pin 4 and ground reaches a predetermined level in part determined by the battery voltage. In the presence of tone A the capacitor between pin 4 and ground discharges through resistor R5 and transistor Q1 until such time as the base of transistor Q6 is pulled down to a predetermined level set by the base emitter junction of Q6 and the diode CR2. This length of time, e.g. the discharge time of the capacitor between pin 4 and ground, determines the minimum time which the A tone must be present before transistor Q6 is rendered conductive.

Transistor Q6 is one of the transistors in a one shot multivibrator which forms the aforementioned two tone timer. It is actuated when the charge on the aforementioned capacitor between pin 4 and ground reaches a predetermined low level indicating the present of tone A for a predetermined period of time. If tone A is present for this predetermined period of time, Q6 is rendered conductive and is clamped in its conductive state via a feedback path which includes its collector, pin 6, the capacitor between pin 6 and pin 5 and the base of transistor Q5 which is likewise rendered conductive when Q6 is turned ON. The one shot remains ON for a length of time determined by the capacitor between pin 6 and pin 5 and resistor R13. It will be appreciated that the output of the two tone timer occurs at pin 6, and is applied to the non-inverting input of the AND gate 186 of FIG. 9 which includes transistor Q7, with the emitter of transistor Q7 forming the non-inverting input. The inverting input to the AND gate is through resistor R15 to the base of Q7.

Turning now to the tone B detector it will be appreciated that Q2 is the tone B detector which works identically as the A tone detector with the capacitor between pin 3 and ground along with resistor R9 forming the B tone timer. Upon receipt of a B tone the voltage at pin 3 decreases to a point where transistor Q7 starts conducting. It will be appreciated that Q7 will not conduct absent a pulse from the two tone timer. In essence, therefore, the AND gate not only serves to detect the presence of an A tone followed by a B tone but also serves as the detector of the B tone which insures that the B tone has existed for the requisite time.

It will be appreciated that both the A tone and the B tone timers are set up with follow-on circuitry which detects when the charge on the capacitors has decreased to a predetermined level corresponding to the presence of a particular tone for a predetermined period of time.

When transistor Q7 is rendered conductive the current through R16 causes the base of transistor Q15 to rise thereby turning ON transistor Q15 which in turn turns ON transistor Q16. It will be appreciated that transistors Q15 and Q16 form part of a second one shot multivibrator illustrated in FIG. 9 as one shot multivibrator 190. This one shot multivibrator remains ON for a period of time determined by the phantom capacitor between pin 10 and pin 9 and the value of resistor R28. This time is usually set for a period longer than the period of the one shot utilized for the two tone timer in order that follow-on apparatus may be rendered operative during the transmission of the entire FSK message. The turning on of the one shot saturates transistor Q17 such that pin 11 is grounded, and is used as a switch contact to render the switched power supply operative.

When the voltage at the collector of Q16 rises, capacitor 196 begins to charge through the circuit including transistors Q8 and Q9 which form an astable multivibrator oscillator. Since pin 13 is coupled to an audio preamplifier and thence to an alarm generator such as a speaker, during the charging of capacitor 196 an audible alarm is produced as the charge on capacitor 196 decays. Capacitor 196 reaches a predetermined high charge level and then starts to discharge. After the current available to transistors Q8 and Q9 is decreased to a point where the circuit comprised of transistors Q8 and Q9 no longer operates. In other words, pin 12 is normally at ground potential, as is the collector of transistor 16. In the presence of a decoded address the potential of the collector of Q16 rises as does the voltage at pin 12 thereby rendering the tone alert circuit operative.

Referring now to the group call timer 200, it will be appreciated that the group call timer includes transistors Q10, Q11, Q12, Q13 and Q14. In operation, a group call is initiated by a prolonged A tone. The output of the one shot pin 6 remains high during the presence of an A tone and this voltage charges the capacitor between pin 7 and ground. When the voltage on this capacitor exceeds that of the voltage on the base of Q14 then transistor Q14 which is normally ON is turned OFF and transistor Q12 which is normally OFF is turned ON. This turns ON the normally OFF transistor Q13 which permits the base of transistor Q15 to rise thereby turning ON transistor Q15. In this manner, transistors Q12 and Q14 form a differential amplifier in which the voltage at the base of transistor Q14 is compared to the voltage at the base of transistor Q12 to reverse the normally ON and OFF conditions of these two transistors thereby to cause transistor Q17 to saturate to turn the switched power supply ON.

The length of time that the A tone must be present in order to reverse the states of the transistors of the differential amplifier is determined by the capacitor between pin 7 and ground and resistor R12. However, should tone A cease prior to this time, transistor Q12 will never be rendered conductive and the charge on the capacitor between pin 7 and ground is shunted to ground through transistor Q11 which is in a darlington pair comprised of transistors Q10 and Q11. This is because the absence of an A tone causes the base of Q10 to go high thereby turning ON transistors Q10 and Q11 to shunt the capacitor between pin 7 and ground to ground.

It will be appreciated that during the presence of an A tone the B tone timer is rendered inoperative because transistor Q14 conducts thereby pulling up the base of Q7 regardless of the condition of transistor Q2. Likewise, in the presence of tone B the transistor Q3 is rendered conductive thereby to clamp the base of transistor Q6 to B+. This isolates transistor Q6 from the condition of transistor Q1.

Referring now to FIG. 11d and the operation of the second mixer IF and audio preamplfier 201 of FIG. 11a, an FM signal entering at pin 4 is mixed at transistor Q1 with a signal generated by an oscillator consisting of a quartz crystal between pin 2 and pin 3 and transistor Q7. The difference between the frequencies of the oscillator and the input signal at pin 4 is filtered at the collector of transistor Q1 and is applied to a series of amplifiers which include transistors Q2, Q3, and Q4. Because of the amplification, transistor Q4 is saturated. The output of the saturated amplifier Q4 is applied to a differentiator comprised of capacitor C9 and resistors R13 and R15. The impulses resulting from the differentiation of the collector voltage of Q4 are applied to the base of transistor Q5 causing it to saturate on positive excursions of voltage at its base. Diode CR4 removes the negative excurions on the Q5 base having been connected between the base of Q5 and ground. The resulting voltage at the collector of Q5 is a series of negative going pulses of fixed width at a rate determined by the input frequency to pin 4. These fixed width pulses are integrated by resistor R17 and capacitor C12 to a voltage determined by the input frequency of pin 4. If the input frequency is modulated in accordance with an audio tone, an audio tone will result at the base of transistor Q6. Transistor Q6 acts as a voltage amplifier to increase the amplitude of the tone and provides an output signal at output pin 4.

Referring now to FIG. 11e, the power amplifier and tone limiter of FIG. 11a is decribed. In essence the power amplifier and tone limiter includes two circuits, one a limiting circuit and the other an amplification circuit. The power amplification portion of this circuit ordinarily resides at B+. When, however, transistor Q17 of FIG. 11c is saturated in response to the receipt of the appropriate address, pin 1 of the circuit of FIG. 11c is grounded thereby turning ON the amplifier circuit. However, limiter 170 is ON all the time.

Referring now to the limiter portion of the circuit, as illustrated in the dotted box limiter 170 receives an audio input from pin 14 of the circuit illustrated in FIG. 11d at its input pin 2. The output of the limiter is obtained at pin 3. Transistor Q5 normally saturates at the audio levels normally expected from the receiver. This provides a constant a.c. output level at pin 3 for a variable input level at pin 2. Thus, transistor Q5 can only put out a given level signal and signals having amplitudes higher than the chosen range are clipped because transistor Q5 saturates. The purpose of the limiter is to prevent excessively high signal amplitudes from reaching the filters which would cause an apparent increase in filter bandwidth.

Referring now to the audio amplifier section, this audio amplifier is a feedback amplifier with a complimentary pair of transistors in its output section. The input to this audio amplifier is from pin 13 of the circuit of FIG. 11c which in essence is the alarm signal from the oscillator. This signal is amplified by transistors Q1, Q2, Q3, and Q4 and is made available across output pins 4 and 5. It will be appreciated that this amplifier is turned ON by the grounding of pin 1 as would be the case when an appropriate address has been decoded since pin 1 is connected to transistor Q17's collector and thence to ground.

This completes the description of the relevant circuits for the tone address pager.

Referring now to FIG. 12, a digital address decoding system is illustrated in which tone decoding is not utilized. In this figure, a receiver 300 signals to that described hereinbefore is connected to an antenna 302 and has its output signal coupled via line 308 to a bandpass filter 310 the output of which supplies an FSK demodulator 306 with a frequency shift key signal. The output of the FSK demodulator is supplied to a digital address decoding circuit 316 via line 314 which is used to gate a switched power supply 318 ON in accordance with both the decoding of the appropriate address and the presence of an FSK signal. In the absence of an FSK signal the power supply is turned OFF. The output of the FSK demodulator is also coupled through line 314 to a character decode unit 315 similar to that described in connection with the tone address pager.

It will be appreciated that in this embodiment the transmission first carries a digital address in FSK form followed by an FSK message. The message decoder is turned ON in response to the receipt of the appropriate address code as decoded by unit 316.

The address is decoded as follows. It will be appreciated that the address code signal is applied to address decode unit 315 which is set up to recognize a particular sequence of ASCII characters. This sequence is initially transmitted prior to the text message for the purpose of activating the desired pager. It will be appreciated that prior to decoding of the address, switched power supply 318, similar to that described hereinbefore, prohibits serial data delivered on line 314 to the character decode unit 315 from having any effect thereon. Moreover, motor operation is inhibited until after the address has been decoded. Like elements of FIGS. 6 and 12 bear like reference characters to complete the description of the FIG. 12 embodiment and reference may be had to FIGS. 6–11a–e for the detailed description of common parts.

The address decode unit 316 in one embodiment, detects the absence of FSK signals and renders switched power supply 318 inoperative. This is accomplished in a manner similar to that described in connection with the apparatus of FIG. 7, where a capacitor is allowed to charge in the absence of an FSK signal, and this function may be accomplished in the address decode unit. Address decode unit 316 may be similar to that of the Aspell device. Therefore, what has been provided is a hard copy pager which responds to digital addressing instead of audio tone addressing.

In neither of the tone address code or digital address embodiments is it necessary to encode an FSK message at the transmitter. While in the prior art there exist a number of systems for translating a dialed telephone number into an address code, either tone address or digital, it is a feature of the subject invention to provide an inexpensive compact message entry unit used after the address has been transmitted which is accoustically coupled to the telephone to provide the requisite FSK tones for transmission to the addressed pager. In one embodiment, as illustrated in FIG. 13, the message entry unit, herein illustrated by reference character 400, utilizes an imprinted tape 402 fed from a paper cassette 403 for providing a written record of what is transmitted via an acoustic coupler 404. The subject message entry unit includes a keyboard 406 for entering the message in which the keys may be designated as illustrated. A transmit key 408 is provided to actuate the internal memory of the message entry unit for transmitting a previously stored message via the acoustic coupler to the pager transmission station. In one embodiment, the message entry unit is provided with a single character LED display 410 such that as each character of the message is entered into the internal memory of the message entry unit it is displayed. In addition to the usual keyboard characters, the keyboard carries a clear key 412 which clears all memory units within the message entry unit, a delete or edit key 414 for deleting one character at a time by an overwriting process, described hereinafter, a space key 416 for providing spaces between characters and a shift key 418 to shift from letters to numbers. A shift indicator light 420 is provided to indicate that the keyboard has been shifted to encode numbers, and a memory overflow light 422 is provided to indicate when the internal memory of the message entry unit is filled.

It is a feature of the subject message entry unit that there is no simultaneous printout of the message when the message is encoded. This obviates the necessity of having synchronism between the keyboard and the printer for the imprinted tape, thereby reducing battery drain and circuit complexity. It will be appreciated that the message can be checked by viewing the LED single character display as the message is entered or by printing the entire message after entry and prior to transmission via the acoustic coupler. An additional feature of the subject message entry unit is that when the internal memory of the message entry unit is full, the tape printer is automatically energized and continues to run until stopped by pushing the clear key. In this manner, a highly visible alarm condition which would, if unchecked, result in loss of a certain portion of the message.

A block diagram of one embodiment of the message entry unit is illustrated in FIG. 14. In this embodiment, an alpha/numeric keyboard 406 drives a keyboard encoding unit 430. The keyboard encoder is of the type that is strobed by the output of a counter to produce a series of output signals corresponding in code to the particular key depressed. The keyboard matrix is set up such that when the shift key is actuated a different set of codes is generated for different numbers. When the shift key is depressed a signal is applied from the keyboard encoder 430 to shift key indicator 420. The output of the keyboard encoder is applied to a one character buffer 432 which feeds the coded signal to a memory 434 and also to a six pole, 2 position switch 436.

Memory 434, in one embodiment, is a recirculating memory which stores a message and rewrites it as it is serially read out so that the message is not destroyed and can be readout again. In this way the message is said to recirculate and the memory is called a recirculating memory. The output of the keyboard encoder is delivered in parallel over 6 lines to the buffer and in parallel over 6 lines both to the memory and the 6 position switch. When the message entry unit is in its message entry mode the switch is set such that the output of the keyboard encoder is coupled to a character ROM (read only memory) 437 which translates the parallel code into a series of dots representing the character such as that described in connection with the pager. Timing and sync signals come from memory control 438. The output of character ROM 437 is applied to a print head driver 440 actuated during message transmission by a print head driver signal from memory control 438 and a display driver 422 actuated during message entry via the print head driver signal inverted at 439 to drive respectively a thermal print head 444 and single character dot matrix display 410. Display driver 442 is set up such that the 5 columns are strobed quickly in synchronism with the particular 5 dot sequence to form the character's 7 rows. This 5 dot sequence is carried by signals on the rows of the display matrix. In this manner there need only be one type output for the character ROM to drive both the print head driver and the display driver, it being understood that both drivers operate in the same manner to produce a character indication. It will be appreciated that during message entry motor 446 is not actuated so that tape 448 from reel 490 is not driven past the thermal print head and idler 492.

Memory 434 is controlled by memory control unit 438 to accept and store the parallel characters as they are entered. This is accomplished by appropriate timing signals from a system check 494 via a timing generator 496 which supplies timing signals not only to the memory control unit 436 but also to the keyboard encoder 430 and to a parallel-to-serial conversion unit 498 to be described hereinafter. The aforementioned "delete" key 414 is coupled not only to memory control unit 434 but also to the one character buffer to clear or erase the character reading in the buffer and the memory when the delete key is depressed. The aforementioned "transmit" key 408 is connected to memory control circuit 438 for actuating and reading out the memory while at the same time controlling switch 436 to connect character ROM 437 to memory 434. At the same time a motor conrol unit 500 is activated to actuate motor 446. Memory control unit 438 also actuates the parallel-to-serial conversion unit 498 which is fed from memory 434 upon actuation of the transmit key. The output of the parallel-to-serial conversion unit is applied to an FSK modulator 502 of conventional design which drives aforementioned acoustic coupler 404. Thus, with the depression of the transmit key, memory 434 is read out to the character ROM and then to the print head driver and also to the parallel-to-serial conversion unit for read out of the serially-encoded signals to the FSK modulator. During the transmit cycle the display driver 422 is inhibited as mentioned hereinbefore.

Should the memory become overloaded, memory control unit 438 positions switch 436 into the position accorded during the transmitting mode and motor control unit 500 is actuated to provide continous tape feed, thereby to provide the aforementioned alarm indicating memory overload.

The memory overflow indicator 422 is used to indicate the memory is approximately full, and is similar to the bell on the typewriter indicating a line is approximately complete.

The aforementioned clear key 412 is coupled to the memory control unit 438 for clearing of memory 434 so that new messages may be encoded. It will be appreciated that upon clearing, memory control unit 438 repositions switch 436 in the message entry mode configuration and that this switch resides in this mode until transmit key is depressed. Switch 436 remains in the transmit position only during message transmission. Further, once the transmit key is depressed the entire system is in the transmit mode for the duration of the message in memory 434. If the message does not occupy the complete memory, memory control unit 438 automatically repositions the switch 436 to the message entry position after the contents of memory 434 have been read out. If memory 434 is full, then the memory recycles continously to produce the above mentioned alarm indication of the continuously running and imprinted tapes. This is stopped by depressing the clear key.

A detailed description of the operation of the FIG. 14 circuits is now presented in connection with FIG. 15. Referring now to FIG. 15, alpha/numeric key matric 406 consists of a 2 row by 16 column cross point matrix, (32 keys maximum). The 16 columns are sequentially pulsed by the 16 decoded outputs of a 1 of 16 decoder 610. The 4 binary inputs to the 1 of 16 decoders are continuously counted through a 16 state binary sequency by the 2nd through 5th bits of a 7 stage counter/frequency divider 611. A contact closure in key matrix 406 connects a decoder pulse on to either the row 1 or the row 2 output of the key matrix. Switch 606, driven from counter/frequency divider 611 bit 6, is configured to permit a row 1 pulse to be transmitted to a one shot and logic circuit 607 when counter/frequency divider bit 6 is a logic 0 and to permit a row 2 pulse to be transmitted to the circuit 607 when counter/frequency divider bit 6 is a logic 1. Note that as long as a key is held depressed, pulses will appear at the input to circuit 607. A shift key and toggled latch circuit 608 is provided to give the 32 key matrix an upper and lower case capability. Depress shift key 418 toggles the state of shift latch from upper case (logic 1) to lower case (logic 0) or vice versa. Shift indicator 420 indicates the state of the shift key latch.

The output of circuit 607 is a single logic pulse, corresponding in time to the 2nd pulse transmitted through switch 606 following a key matrix contact closure. In one embodiment, the 2nd pulse is chosen to eliminate switch contact bounce problems. Now if the keys in the matrix 406 are properly labeled activation of a specific key will generate a clock pulse output from circuit 607 which will correspond to a state of counter/frequency divider 611 and that counter state will be the ASCII character code for the key depressed. An example will illustrate. Labeling the row 2, column 3 key as R, depressing this key will cause pulses from decoder output 2, corresponding to counter state 0100 (Q1 through Q4, least significant bit first), to appear on the key matrix row 2 output. These pulses are transmitted through switch 606 when counter bit Q5 is logic 1, i.e., pulses appear at input 607 when the counter state is 01001. If the state of the shift latch is logic 0, the 6 bit code clocked into buffer 432 which may be a 6 bit register will be 010010, the ASC II code for the letter R. 408

Power is applied to logic by closure of a switch 640 which connects batteries 642 and 644 as shown. Memory 434 may be a 6 × 128 recirculating static shift register memory. This memory and a 1 × 128 recirculating static control shift register 625 are first cleared by depression of clear key 412. The depression of an alpha/numeric key, the transmit key 4:8 or clear key 412 all result in the generation of a single logic clock pulse at the output of circuit 607. The single pulse generated from activation of the clear key has been made to correspond to the counter 611 state and the ASCII code for a space 000001. Thus, pressing the clear key loads the character space into buffer 432.

The clear key output is connected to a clock control 623 and a memory recirculation control 630. Activation of the clear key causes the clock control to output approximately 500 clock pulses to the clock input of shift register memory 434 and control shift register 625. Concurrently with the 500 clock pulse burst, the memory recirculation control 630 output opens the recirculation loops of the memory and control shift registers 434, 625 respectively. The preceeding action described results in the character space to be parallel loaded in all 128 shift register memory locations and a logic 0 to be loaded in all 128 bit locations of the control shift register. This is the memory clear state. The clear key also resets memory character counter 626.

As mentioned hereinbefore, the unit contains a single character, alpha/numeric LED dot matrix display 410 for purpose of displaying the ASCII character whose code is defined by the contents of buffer 432. Six pole two position switch 436 is normally in the position which connects the buffer output to the dot matrix character ROM 437, except when the unit is in the transmit mode. The dot matrix character ROM refreshes display 410 in the conventional manner, the 7 ROM outputs being connected to the 7 row inputs of the display via row drivers 618 with the 7 ROM outputs being repeatedly sequenced through the 5 columns of the displayed character. In the memory clear state the display shows the character space i.e., the display is blank.

For illustrative purposes, loading of the word TEST into memory will be described. Initially, the unit will be assumed to be in the memory clear state. As described, depressing the T key will cause the ASCII code for T to be loaded into the buffer. More specifically, the trailing edge of the clock pulse from circuit 607 loads the buffer. A clock edge somewhat delayed from the leading edge of the pulse from circuit 607 is first generated by clock control 623, clocking the memory 434 registers and control register 625. In this way the contents of the 6 buffer outputs, SPACE, are copied into the memory and a logic 1 is loaded into the leftmost bit of the control register, all just prior to the code in the bffer changing from SPACE to T. The display now shows T. When the E key is pressed, the character code for T in the buffer is copied into the memory and E is displayed. The leftmost shift register columns now contain the following characters as illustrated by the states of the shift register memory and the control register in Table I:

TABLE I

| Characters | "T" | S P A C E | | | |
|---|---|---|---|---|---|
| Shift Register Memory (6 bits) | 0<br>0<br>1<br>0<br>1<br>0 | 0<br>0<br>0<br>0<br>0<br>1 | X<br>X<br>X<br>X<br>X<br>X | X<br>X<br>X<br>X<br>X<br>X | X = don't care |
| Control Register | 1 | 1 | 0 | 0 | |

Following depression of the S and T keys, the left-most shift register columns contain the following characters as illustrated by the states of the shift register memory and the control register in Table II:

TABLE II

| Characters | "S" | "E" | "T" | S P A C E | | |
|---|---|---|---|---|---|---|
| Shift Register Memory (6 bits) | 1<br>1<br>0<br>0<br>1<br>0 | 1<br>0<br>1<br>0<br>0<br>0 | 0<br>0<br>1<br>0<br>1<br>0 | 0<br>0<br>0<br>0<br>0<br>1 | X<br>X<br>X<br>X<br>X<br>X | X<br>X<br>X<br>X<br>X<br>X |
| Control Register | 1 | 1 | 1 | 1 | 0 | 0 |

Not that at the completion of composing the word, the last letter of that word (here a T) has not yet entered shift register memory. Note also that the control register is delimiting with logic 1 bits that portion of the shift register memory which contains message characters.

Clock control 623 increments memory character counter 626 as each new character is loaded into memory.

Editing may be performed only on the character visible on the LED display, that is, the character whose code is contained in the buffer. Depressing delete key 414 clears the buffer and inhibits the clock control from generating the next clock output to the memory 434 and the control register 625. The display now shows an "@" symbol (ASC II code 000000). Pressing another alpha/numeric key now results in that character being displayed. The aforementioned inhibit condition is removed after the loading of this new character into the buffer, thus preventing the "@" character from being loaded into the memory.

When transmit key 408 is depressed, two events occur: 1) the message stored in the memory is written on thermal print tape and 2) the message is serially formatted for asynchronous transmission and FSK modulation. 1) and 2) above occur synchronously and simultaneously.

Transmit key activation first sets the transmit latch 601 and generates a clock pulse on the output of the one shots and logic circuit 607. This clock pulse results in clock control 623 clocking the memory and control registers, thus copying the last alpha/numeric message character code contained in the buffer into the memory. The clock control circuit now 1) turns on the thermal print tape drive motor 446 via the motor drive 500, 2) inhibits the alpha/numeric display via he inhibit input to a column driver multiplexer 629, 3) reconfigures the 6 pole 2 position switch 436 so as to connect the shift register memory output to the character ROM input, and 4) rapidly clocks (fast forward) the memory and control registers until the first delimiting logic 1 bits appears at the output of the control register. At this point serial-to-parallel data conversion is initiated on the first message character (now at the output of the shift register memory) and the character ROM sequences through the 5 columns of this first character causing it to be printed on the moving thermal print tape via resistive print head 440 and resistive print head 444. Following the transmission and printing of the first message character, the memory and control registers are clocked by clock control 623, bringing the 2nd message character code to the outputs of the memory. This 2nd character is transmitted and printed like the first. The transmit and print operation continues until the ouput of control shift register 625 returns to logic 0, indicating the end of the message. At this time the clock control, following an approximate 1 second delay, 1) shuts off the motor, 2) returns switch 436 to its normal position, and 3) removes the inhibit from column driver multiplexer 629.

The recirculation loops of the memory and control registers are left closed during message transmission so that as the message is transmitted it is loaded back into memory. In this way the message may be transmitted several times, or additional text may be added following each transmission.

What has thus far been described is a paging system in which the paper produces a hard copy in alpha/numeric form of a message to be transmitted to the recipient. This message is imprinted on tape for viewing at the convenience of the recipient. Referring to FIG. 16 a pager 700 is illustrated in which a received message is reproduced in alpha/numeric form by a precessing display 702. This pager also can be used for message encoding and has a keyboard 704 for this purpose. The pager has an internal memory into which a message may be written, either by receipt of a transmitted signal or by local keyboard message entry. In the encoding mode the message is entered into the internal memory and then transmitted by an acoustic link 706 to a transmitting station. In one embodiment, the encoded message is displayed on a 12 character precessing LED display which is utilized for message composition and for editing prior to message transmission. A sufficient number of keys are provided on the face of the message encoder/soft copy pager to permit correction and to instigate read out of the encoded message from the internal memory of the pager. The encoded message is made available at link 706 which is acoustically coupled through telephone lines to a remote high power transmitting station. Alternatively, the message encoder/soft copy pager may be provided with a transmitter such that the address and message may be transmitted from this unit for a short distance to other pagers within the area. For this purpose, a collapsible antenna 712 is provided as illustrated.

In either the receive or encode mode the message in the memory is precessed across the display. By precessing is meant that the message is made to travel across the display such that the portion of the message that has already been viewed disappears, while at the other end of the display new portions of the message are generated. As will be appreciated, receipt of a message may be indicated by any convenient message indicator. Various indicator lights, generally indicated by reference characters 708, are available on the face of the unit to indicate the various modes of operation of the device such as an indication of Power-ON and receipt of a message, that a compose cycle is selected, that a message is being transmitted or that a message is being held. The recipient displays the message by pressing an appropriate key on the keyboard. Should the recipient wish to stop the message from precessing a "freeze" switch 710 is provided. In this embodiment the receipt of a new message automatically clears the old message from the memory included in the soft copy pager unit. In another embodiment the messages can be made to "stack" into memory.

In operation, a message for the soft copy pager is transmitted with a predetermined digital address in this case. After decoding of the address, the FSK message code is decoded within the pager and stored in an internal memory. This memory is read out in a precessing fashion to a character decoding read only memory (ROM) which is utilized in driving an electronic alpha/numeric display.

It will be appreciated that this pager serves the function of preserving the message for recall at the convenience of the recipient while at the same time providing that the message may be stored silently and recalled silently thereby not disturbing individuals in the vicinity of the pager.

Thus, in one unit a message encoder and message receiving apparatus is combined. The significance of the combination is that the same precessing internal memory and the same read only memory may be utilized for message encoding and message decoding. Thus, in one embodiment pager 700 functions as a soft copy pager, a message encoder, and a message transmitter. A block diagram of one embodiment of the soft copy pager of FIG. 16 having these three capabilities is illustrated in connection with FIG. 17 and is now described.

Referring to FIG. 17, a block diagram of one embodiment of the soft copy digital message communicator is illustrated as including a receiver 720 connected to an antenna 722. The output of the receiver is connected to an FSK demodulator 724. The output of the FSK demodulator includes serial data which is coupled both to a clock extractor 726 and to a serial-to-parallel register 728. The output of the serial-to-parallel register is the ASCII code of the incoming data. This is applied to a 6 pole, 2 position switch 730 which in the receive mode couples the data to the recirculating shift register memory. In the second position switch 730 couples keyboard generated ASCII characters into the memory. In this FIGURE the recirculating shift register memory is indicated by reference character 732 and the keyboard by reference character 734.

The output of the FSK demodulator 724 is also coupled to an address or I.D. code recognition circuit 736 which, upon decoding of the proper ASCII character sequence, couples a signal to a mode control circuit 738 which forces the system into the receive mode by control of switch 730 and control of a clock extractor 726 which inter alia provides timing for the data transmission in the transmit mode. A signal is also transmitted over line 739 from the ID code recognition circuit to clear memory 732 in response to a signal indicating a mode change from mode control circuit 738. The status of the system is indicated by status indicators 741 which are driven by the mode control circuit.

In the receive mode, data from the serial-to-parallel register 728 is transmitted to recirculating shift register memory 732 which is under control of memory control shift register 740. The purpose of the memory control register is to ascertain the length of the message stored in memory 732 and the beginning thereof. This permits the readout of the message from memory 732 to the dot matrix character ROM 724 following the complete reception of the message. The dot matrix character ROM is read out to a row driver and multiplexer 744 and to a data refresh and keyboard decoder timing circuit 746. The display refresh and keyboard decoder timing unit 746 provides the appropriate timing signals for the column driver herein indicated by the reference character 748 such that the columns are actuated in the proper sequence to display memory contents. The display in one embodiment is a 12 character LED dot matrix display 750 such as Monsanto MKA3. The line between ROM 742 and display refresh and keyboard encoder 746 illustrated by line 752 is a two-way line which controls the timing of the character readout from the dot matrix in terms of the row driver and synchronizes this with the column driver activation and the multiplexing thereof.

It is an important feature of this portion of the soft copy unit that the message be stored in the memory for readout at the convenience of the recipient and also that the message be formed in such a way that it can be precessed across the dot matrix display. Readout of the message is accomplished by actuation of switch 754 which activates mode control 738 to establish a signal on line 756 thereby to control shift register timing and control unit 758 to activate the memory control register 740 which in turn activates memory 732 to serially dump its contents through to the dot matrix character ROM 742 in a recirculating manner thereby to cause the displayed characters to precess. Auxiliary switch 760 is provided to freeze the precession by controlling the memory control register.

It will be appreciated that memory 732 in essence acts as a refresh buffer to restore the readout characters so that they can be read out again during recirculation. Thus, memory 732 in one sense is not a destructive memory and will destruct the data therein only upon command stimulated by the receipt of a new message, or by clearing due to keyboard encoding.

What has been described so far is the decoding of a received message by the subject soft copy unit. As mentioned hereinbefore, in connection with FIG. 16 it is possible to use this same unit for encoding the message and displaying the encoded message prior to transmission. In this sense the display is utilized in the formulation of the message and can be utilized in a manner so that errors in the message may be corrected prior to transmission. To accomplish this the message is encoded by actuation of keyboard 734 which in turn actuates display refresh and keyboard encoder timing 746 to generate a 6 bit character code over line 762 which is coupled to switch 730 to enter the characters into the recirculating memory. This line also initially carries a signal which activates the mode control 738 to generate a signal coupled to switch 730 to switch from its receive mode to a message composition mode. Thereafter, the message is entered into the recirculating register from the keyboard and is simultaneously read out via the dot matrix character ROM to the display as described hereinbefore.

It will be appreciated that the output of the memory 732 is coupled to a parallel-to-serial converter 770 which converts the ASCII coded characters into a serial transmission for actuating FSK modulator 772 to modulate transmitter 774 to transmit the data. In the receive or encode mode, although data is continuously coupled from memory 732 to parallel-to-serial conversion unit 770 there are no clock pulses delivered to this unit so that no data is transmitted. When, however, the message to be transmitted has been successfully encoded, a character of a special type is transmitted on line 762 to the mode control unit 738, which forces the mode to the transmit mode. This develops a signal on lines 775 and 776 to actuate the transmitter and to actuate clock extractor 726 to produce clocking pulses on line 778 thereby to clock the parallel data into the parallel conversion unit 770 from whence it is coupled to the FSK modulator. It will be appreciated that the transmitter utilized may be internal to the soft copy unit or may be remote therefrom for the transmission of both the address and the message to another remote paging unit which may be either an identical soft copy unit such as described, or a hard copy unit in which digital addressing is utilized. The FSK output as illustrated by line 780 may be coupled to a suitable modem which transmits the address and message over standard telephone circuits to a remote transmitter such that the subject soft copy message communicator may be utilized solely as the encoder. Thus encoders at different locations may be connected via a telephone link to the same transmitter with appropriate circuitry at the transmitting station to prevent overlap or to allow sequential access.

The precession of the display is accomplished, in one embodiment, as follows. The first character which is entered into the recirculating shift register memory from switch 730 causes a single one bit wide pulse to be clocked into the memory control register 740. This bit will subsequently be referred to as the pointer bit. The purpose of the pointer bit is to indicate the beginning of the message within the total length of the shift register memory. It's secondary function is to indicate the beginning of the display refresh cycle within the shift register memory when it is used for that purpose.

A second function of memory control register 740 is to provide a timing pulse to indicate the duration of the message stored in the memory. This is accomplished by clocking into memory control register 740 a logic level 1 bit each time a new character is clocked into the recirculating shift register memory 732. In this way a logic level 1 pulse is formed in the memory control register which is coincident or synchronous with the message character contents of the recirculating shift register memory.

It will be appreciated that a 6 bit ASCII coded message is serially clocked into the recirculating shift register memory. The beginning of this message is indicated by the aforementioned pointer bit and its duration in indicated by the number of logic level 1 bits entered into the memory control register. This permits the recirculation of the message in the shift register memory via a feedback circuit within the shift registers. For this purpose shift registers manufactured by National Semiconductor Co., model MM5056 may be utilized.

The clocking of the message so as to permit recirculation is accomplished via the output terminals of the shift registers within the memory control register. Depending on which portion of the cycle is then present, a certain number of clocking pulses are provided to the recirculating shift register memory to accomplish the recirculation. The clocking for recirculation is many times that for readout so that reloading of the memory during recirculation is done at a fast rate between two readout clock pulses. The pointer pulse and the length of message pulses are decoded such that fast timing pulses to the memory are only delivered for a length of time sufficient to recirculate the message. In order to stop the message at the appropriate point of its beginning, the pointer bits are recognized and the quick recirculation is terminated.

In the receive mode the precession takes place automatically because the pointer bit is automatically shifted by the timing control circuit to the memory control register. This is accomplished by a timer comprising a monostable multivibrator within shift register and timing control circuit 758 which, when it times out, produces a clock pulse which shifts the pointer bit in the memory control register by one bit. In so doing, one character from the portion of the memory displayed is dropped and one character from the portion of the memory not displayed is added. The time contant of this monostable multivibrator is made compatible with the precession rate desired. It will be appreciated by altering the timing components of the multivibrator that the precession rate can be easily varied. Moreover, the precession rate is not controlled by any fixed counter or counting type logic but rather is simply dependent upon the time out period of the multivibrator. The automatic time out feature is disabled during the encode mode by the mode control circuit.

The output signals from the recirculating shift register memory are applied as inputs to the dot matrix character ROM 742. The dot matrix character ROM drives the row driver multiplexing circuit 744 and via the display refresh and keyboard encoder timing circuit 746 drives the column driver and multiplex circuit 748 such that characters are read out of the dot matrix ROM in 5 columns per character. Because of the recirculation of the shift register memory, the dot matrix character ROM is refreshed with the message such that, in one embodiment, the 12 most recent characters are decoded by the ROM and are displayed. A Fairchild Memory Model No. 3257 is utilized as the dot matrix character ROM. It will be appreciated that row driver 744 includes switchable current sources for applying a voltage to the appropriate rows of the LED dot matrix display 750. The columns of these displays are actuated by the display refresh and keyboard encoder timing 746 which sequentially actuates the columns to produce the characters. This completes the description of the generation of a precessing display when the paging unit is in the receive mode.

In the encode mode, one of the functions of the pointer bit is to blank the display so that as each character is entered via the keyboard it replaces a blank portion of the display with the appropriate character. In normal operation, the recirculating shift register memory refreshes continually. With the advent of the pointer bit the recirculating shift register cyclically reads out blank characters or spaces. Upon the depression of a character key this character is added after the pointer bit and the blank characters are shifted one position to the right in the shift register such that one of the blank characters is lost and one character is added. This is reflected in the next character refresh cycle and the key depressed is now present for visual verification. The character refresh is going on all the time and at a very rapid rate such that the columns of the matrix display are rapidly and sequentially actuated via the clocking of the display which also reads out the dot matrix character ROM. It will be obvious that the refresh cycle must be sufficiently rapid to avoid flickering of the display. It is therefore important when entering a character into the recirculating shift register memory that this be done at the appropriate time. In this case the appropriate time means at the end of a refresh cycle. It is therefore the function of the pointer bit to insure that the character is entered into the recirculating shift register memory at this particular point in time. When a character key is depressed the pointer bit is delayed by one bit position within the memory control register. This permits the next character to be entered at the correct time in the refresh cycle. When the display is full (12 characters displayed) the delay of the pointer bit by one bit results in the display now presenting the characters following this pointer bit such that one character is deleted and one character is added.

By the shifting of the pointer bit, what is displayed therefore are 11 old characters and 1 new character with the new character being the last one entered. This corresponds to a manual precession of the display such that the precession is controlled by the position of the pointer bit within the memory control register.

What has been accomplished therefore is that by the depression of keys in the keyboard a message is loaded into the recirculating shift register memory in timed relationship to the refresh cycle which is established by a pointer bit originated by depression of a control key and the appropriate character key in the keyboard. Since the recirculating shift register memory is continually read out to the dot matrix character ROM, what is read out of the shift register memory is displayed. Thus changes in data held by the memory are immediately displayed.

Editing of the encoded message is accomplished very simply by precessing the display to the point where the inaccurate or error character is at the right hand most portion of the display. This corresponds to the pointer bit location and merely entering the appropriate correction at that time replaces the character in error with the corrected character. The corrected character then appears at that display position corresponding to the key depressed.

Thus a convenience feature of this particular pager is that there is provided on the keyboard a key which, when actuated simultaneously with the control key causes the precessing circuit to time out such that the display precesses by one character at a time in a forward direction, corresponding to one depression of the key. This enables editing of the message by exactly positioning of the message within the display such that locating of the error character at the right most display position is easily accomplished.

Another attractive feature of the subject pager is that by a simple freeze switch the automatic precessing circuit is disabled thereby freezing the message on the display in the position at the moment that the freeze switch is actuated. Precessing continues when the precessing circuit is again enabled by throwing the freeze switch to its OFF position. It will be appreciated that the freeze switch is in the freeze position during message composition.

It will also be appreciated that by tapping off of the lines between the recirculating shift register memory and the dot matrix character ROM to parallel-to-serial conversion shift register 770, the encoded message may be made available at the output of this shift register for transmission.

In order to transmit the encoded message a control key is depressed on the keyboard along with a preselected character key such that the recirculating shift register memory is read out in a timing sequence compatible with the transmission of FSK modulation to a transmitter. It will be appreciated that parallel-to-serial conversion register 770 is loaded in synchronism with the clocking of the recirculating shift register memory during the specially timed readout. By virtue of the specially generated clocking signals the recirculating shift register is read out in parallel a word at a time to the parallel-to-serial conversion register. Thereafter, the parallel-to-serial conversion register is clocked serially to read out this word.

With the output of the parallel-to-serial conversion register 770 being applied to a conventional FSK modulator it will be appreciated in one embodiment that the signal from the FSK modulator may contain an address code followed by a message. The addresses will, of course, be entered from the keyboard as a prefix to the message to be transmitted. The pager which receives this message obviously does not display the address code but is rather actuated after receipt and decoding of its particular address code. Thus, in the case of digital addresses the keyboard of the subject pager may be utilized to formulate these addresses.

In another aspect of the subject invention it is a feature that the same counter provides a timing sequence to refresh the LED dot matrix display by reading out the memory cyclically and provides for the encoding of signals (i.e., character codes) to be read into the recirculating shift register memory. In one configuration, illustrated in FIG. 18, an n-bit binary counter 800 in display refresh and encoder timing circuit 746 is utilized which has a certain number of significant bits, for purposes of illustration in this case, 4. These least significant bits are utilized through a 1-out-of-16 binary decoder circuit 802 to drive the display made up of multiple 5 × 7 dot matrices 803 via column drivers 804 and to drive encoder keyboard 734 such that the data is read out in 3 character blocks. The rows of matrices 803 are driven by row driver 806 in accordance with dot matrix character generator 742. After the 4 least significant bits, the next least significant bits are then routed to a row driver group enable decoder 807 also in circuit 746 which is utilized to drive the next group of characters to be presented. In this manner the message is grouped via sets of 3 characters and in this sense the character generation and display is multiplexed. The use of the n-bit binary counter sets the multiplexing for the display such that a minimum of rows and column drivers are required. This counter is used both in the encoding of a message when the message is to be encoded as well as in the driving of the display. What will now be described is the interaction of the keyboard with the n-bit binary counter to provide the 6 bit ASCII character codes during the encoding operation.

As mentioned before, a 1-out-of-16 binary decoder 802 is provided along with 15 column drivers, and 16 column keyboard matrix 734. The function of this binary decoder is to decode the 4 least significant bits of the n-bit binary counter and to simultaneously drive both the column drivers in sets of 5 and the 16 columns of the keyboard matrix.

In the generation of the 6 bit ASCII code characters, the n-bit counter is continually cycled via timing logic 816 to sequentially present by it states all ASCII character codes to a data register 808. Binary decoder 802 is also cycled to produce output pulses at its output terminals in a serial fashion so that during a complete cycles all characters are available as a combination of the signals from the n-bit counter. At the same time, the cycling binary decoder outputs are used to drive the columns to the display. This cycling occurs very rapidly to prevent flicker of the display. Since the outputs from the binary decoder are applied to different keys in a timed sequence, depending the key switch closed at a given time in the read out cycle, an enable pulse correlated with the character to be encoded is gated over line 809 to data register 808 which is fed in parallel with the output of the n-bit binary counter. At any given time the n-bit binary counter has an output which corresponds to a given character. Thus, at a given instant of time the state of the n-bit counter corresponds to a character, for instance the letter "M". If the "M" key is depressed at this time, then the data register is loaded to encode "M" and this character is entered into the recirculating shift register memory.

The gating logic for gating the enable pulse to the data register is illustrated in dotted box 810 and operates in combination with the fifth bit of the n-bit shift register. The fifth bit determines whether it is the top or bottom row of the keyboard which is actuated. In one embodiment, the keyboard has 2 rows and 16 columns. An electronic (digital) switch is provided to enable the choosing of which row of the keyboard is actuated by controlling the state of the fifth bit in the n-bit shift register. This electronic switch includes a shift key 812.

In summary, it is the function of the binary decoder in the display refresh and keyboard decoder timing circuit 746 to provide 16 output terminals and to produce sequentially a series of pulses, each at a different out terminal, the time that each pulse is generated corresponding to a state of the counter as it cycles through its 16 states and therefore a character. This relates the output terminals to the character represented by the state of the n-bit binary counter. Thus, if a pulse appears at the 0 output of the binary decoder this corresponds to a state of the n-bit binary counter and some predetermined ASCII character. If a pulse appears on the 1 output of the binary counter this will occur at a subsequent period of time and indicates that the n-bit binay counter has changed thereby to recognize a different ASCII character. The closing of a keyboad switch connects the pulse from an associated output of the binary counter to a gating system to provide a dump signal to the data register which changes its ASCII output with each change of the n-bit register. The binary decoder cycles through its 16 states sequentially such that the depression of a key will produce a clock pulse to the data register which clock pulse arrives at a time corresponding to the given character. Thus, in a given sequence the delivery of a dump pulse to the data register results in the dumping of the particular ASCII code to the recirculating shift register memory. What has therefore been accomplished is that by delivering a dump pulse to the data register at a particular predetermined time in the sequence, the n-bit counter state is read out for that character through the data register and into the recirculating shift register memory as the appropriate ASCII code.

It will be appreciated, however, that if the key in the keyboard is depressed for a long period of time, absent any additional circuitry, the character will be repetitively read into the memory. This is undesirable since the depression of a key once is supposed to result in only one character being read into the memory. A circuit is therefore utilized which provides that for a single depression of a keyboard key only one character is read into the recirculating shift register memory. Basically this is accomplished by reading a clock 814 pulse only once for one key depression no matter how long the key is depressed. If multiple characters of the same type are to be read in, the key must be depressed a number of times.

Thus, the n-bit binary counter and binary decoder act as a single logic block or circuit to decode the characters entered at the keyboard while at the same time supplying timing signals to the column drivers of the display. In this connection, counter 800 is stepped through states representing all of the alpha/numeric characters. The binary decoder decodes these characters and produces sequentially a series of timing pulses at its output terminals. These signals sequentially actuate the columns of the matrices via drivers 804. Simultaneously, an output from a particular output terminal of the decoder defines a particular state of counter 800 and thus a character. It will be appreciated that counter 800 and decoder 802 are clocked quite rapidly such that the columns are actuated in quick succession. When a message is to be displayed, dot matrix character generator 742 is clocked and the first group row driver is enabled. Generator 742 produces the appropriate signals for energizing the appropriate dots for the first column of the character to be displayed. On the next clock pulse, generator 742 produces signals for energizing the appropriate dots for the next column of this same character, etc. Thus the columns are always being quickly strobed while the rows are actuated in synchronism.

For keyboard encoding purposes the outputs of decoder 802 function not as timing signals, but rather as signals indicative of the state of the binary counter. For instance, outputs 0–4 can correspond to characters A, B, C, and D. As mentioned before, the fifth n-bit binary counter output can be used to designate whether switches 1–6 are activated or switches 17–32. Thus the 16 outputs of the decoder can determine 32 characters. If during the strobing a particular key is depressed, sometime during the strobing cycle a pulse will be delivered to logic 810 to cause data shift register 808 to transmit a binary code to the recirculating shift register memory. Because the pulse transmitted corresponds in time to a particular state of the n-bit counter the character read out of the n-bit counter at this time is the one corresponding to the key depressed.

In this way the same logic circuit serves to generate one set of signals for both display timing and character designation.

It will be noted that both the row drivers and the column drivers are multiplexed. First the leftmost group row driver is activated simultaneously with the sequential activation of the columns associated with the three leftmost column drivers. After the first three matrices are activated, the next group row driver is activated and the next set of three matrices is enabled. Thus the matrices are enabled in sets of three. In this embodiment row driver selection is accomplished by circuitry within row enable decoder 807. It will be appreciated that the column drivers are sequenced by the connections of the column drivers to successive output terminals of decoder 802.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:

1. A method for improving battery-operated performance and maintaining print legibility despite battery voltage decrease in a battery-operated, hand-held printing pager, in which the pager includes a tape and a print head driven in accordance with message signals decoded at the pager, and in which the pager is addressed by a predetermined paging code followed by message signals corresponding to alpha/numeric characters, comprising the steps of providing the pager with battery-operated motor-driven tape drive means in which the motor is continuously driven upon the application of power thereto for advancing the tape continuously past the print head during the printing of the alpha/numeric characters at a speed dependent on the battery voltage, and connecting the motor to the battery of the battery-operated pager through power switching means actuated to turn on the motor for the duration of the printing of the message in accordance with the decoding of a predetermined address at the pager, the legibility of the characters imprinted on the tape by the print head being virtually unaffected by variations in battery voltage and consequent variations in motor speed and the reliability of the printing operation being improved by the utilization of the continuously driven motor.

2. In a battery-operated, hand-held printing pager which includes a housing, a battery, means for receiving message signals corresponding to alpha/numeric characters in a message, a tape and a print head, the improvement comprising:

means including a battery-powered motor within said housing which is continuously driven upon the application of power thereto, for continuously advancing said tape past said print head during the printing of said characters at a speed dependent on battery voltage, switching means connecting said motor directly to the pager battery for applying power to said motor for the duration of the printing of a message; and battery-operated means within said housing for driving said print head to print the received characters during the continuous movement of said tape past said print head in a manner which is substantially independent of the speed of said tape relative to said print head, whereby print legibility is relatively unaffected by speed changes of said battery powered motor due to battery voltage fluctuations.

3. The battery-operated printed pager of claim 2 wherein said print head is in direct contact with said tape.

* * * * *